(12) United States Patent
Kang et al.

(10) Patent No.: US 11,919,996 B2
(45) Date of Patent: Mar. 5, 2024

(54) PREPARATION METHOD OF POLYMER

(71) Applicants: LG ENERGY SOLUTION, LTD., Seoul (KR); Regents of the University of Michigan, Ann Arbor, MI (US)

(72) Inventors: Joon Koo Kang, Daejeon (KR); Jeong Ae Yoon, Daejeon (KR); Jong Heon Kwak, Daejeon (KR); Sung Soo Yoon, Daejeon (KR); Jinsang Kim, Ann Arbor, MI (US)

(73) Assignees: LG ENERGY SOLUTION, LTD., Seoul (KR); REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/725,318

(22) Filed: Apr. 20, 2022

(65) Prior Publication Data
US 2022/0243003 A1 Aug. 4, 2022

Related U.S. Application Data

(62) Division of application No. 16/808,011, filed on Mar. 3, 2020, now Pat. No. 11,339,246.

(51) Int. Cl.
*C08G 61/12* (2006.01)
*C08F 2/06* (2006.01)
*C08F 2/48* (2006.01)

(52) U.S. Cl.
CPC .............. *C08G 61/126* (2013.01); *C08F 2/06* (2013.01); *C08F 2/48* (2013.01); *C08G 2261/1422* (2013.01); *C08G 2261/1424* (2013.01); *C08G 2261/3247* (2013.01); *C08G 2261/40* (2013.01)

(58) Field of Classification Search
CPC . C08F 2/06; C08F 2/48; C08G 61/126; C08G 2261/11; C08G 2261/124; C08G 2261/126; C08G 2261/141; C08G 2261/1412; C08G 2261/1422; C08G 2261/1424; C08G 2261/146; C08G 2261/142; C08G 2261/3223; C08G 2261/3247; C08G 2261/40; C08G 2261/43; C08G 2261/64
See application file for complete search history.

(56) References Cited

U.S. PATENT DOCUMENTS

| | | | | |
|---|---|---|---|---|
| 4,721,751 A * | 1/1988 | Schappert | .......... | C08G 18/6594 528/48 |
| 4,766,198 A * | 8/1988 | Harper | .................... | H01M 4/60 528/379 |
| 5,247,098 A * | 9/1993 | Kumagai | ............... | G11B 7/244 549/60 |
| 5,320,936 A * | 6/1994 | Kumagai | ............. | C07D 333/24 252/586 |
| 6,632,472 B2 | 10/2003 | Louwet et al. | | |
| 7,048,874 B2 * | 5/2006 | Louwet | ................... | H01G 11/48 252/500 |
| 7,378,039 B2 * | 5/2008 | Louwet | .................. | H01G 11/48 252/500 |
| 7,687,598 B2 * | 3/2010 | Yamahara | ............ | C08G 83/003 428/411.1 |
| 8,318,046 B2 | 11/2012 | Hsu et al. | | |
| 8,455,865 B2 * | 6/2013 | Hsu | ........................ | B82Y 30/00 257/E31.007 |
| 8,597,547 B2 | 12/2013 | Grigorian et al. | | |
| 8,784,690 B2 * | 7/2014 | Badre | ..................... | C08L 65/00 252/500 |
| 8,908,252 B2 | 12/2014 | Sotzing et al. | | |
| 8,945,427 B2 | 2/2015 | Hsu | | |
| 8,987,720 B2 | 3/2015 | Suematsu et al. | | |
| 9,672,991 B2 | 6/2017 | Yan et al. | | |
| 2012/0097898 A1 * | 4/2012 | Seshadri | ............. | H10K 85/113 252/500 |

FOREIGN PATENT DOCUMENTS

WO 2016/172081 A1 10/2016

OTHER PUBLICATIONS

Bahry et al. Radiation-induced polymerization of 3-hexylthiophene in oxygen-free and oxygen-saturated dichloromethane solvent, Radiation Physics and Chemistry, vol. 180, Nov. 25, 2020 (availably online date) (Year: 2020).*
Bahry et al. Radiation-induced polymerization of 3-hexylthiophene in oxygen-free and oxygen-saturated dichloromethane solvent, Radiation Physics and Chemistry, vol. 180, Mar. 2021, 109291 (Year: 2021).
Balashubramaian et al. Chain-growth cationic polymerization of 2-halogenated thiophenes promoted by Brønsted acids. Chem., 2014,5, 5928-5941 (Year: 2014).
Mathews et al. Scalable Synthesis of Fused Thiophene-Diketopyrrolopyrrole Semiconducting Polymers Processed from nonchlorinated Solvents into High Performance Thin Film Transistors. Chem. Mater. 2013, 25, 782-789 (Year: 2013).
Tusy et al. Synthesis and investigation of novel thiophene derivatives containing heteroatom linkers for solid state polymerization. RSC Advances. (4)16, 2014, p. 8011 (Year: 2014).

(Continued)

*Primary Examiner* — Sanza L. McClendon
(74) *Attorney, Agent, or Firm* — BRYAN CAVE LEIGHTON PAISNER LLP

(57) ABSTRACT

The present application can provide a preparation method that can effectively produce a polymer having desired molecular weight characteristics and solubility in a solvent, and having a monomer composition, which is designed freely and variously according to the purpose, without unnecessary components with excellent polymerization efficiency and conversion rates, and a dispersion comprising the polymer formed by the preparation method.

12 Claims, 17 Drawing Sheets

(56) References Cited

OTHER PUBLICATIONS

Sato et al. Preparation of polythiophene thin films by UV laser-assisted deposition of 2,5-dichlorothiophene with a 248 nm excimer laser beam, Journal of Photochemistry and Photobiology A: Chemistry, vol. 116, Issue 3, 1998, pp. 245-249 (Year: 1998).

Kawade et al. Photodissociation Dynamics of Halogenated Thiophenes at 235 nm: A Resonance Enhanced Multiphoton Ionization-Time-of-Flight (REMPI-TOF) Study. The Journal of Physical Chemistry A 2012 116 (44), 10656-10667 (Year: 2012).

Hiesang Sohn et al., "Novel Flexible Transparent Conductive Films with Enhanced Chemical and Electromechanical Sustainability: TiO2 Nanosheet-Ag Nanowire Hybrid", ACS Appl. Mater. Interfaces 2018, 10, 3, 2688-2700.

Michel De Keersmaecker, et al., "All Polymer Solution Processed Electrochromic Devices: A Future without Indium Tin Oxide?" ACS Applied Materials & Interfaces 2018 10 (37), 31568-31579.

Yijie Xia, et al., "Highly conductive poly(3,4-ethylenedioxythiophene):poly(styrene sulfonate) films treated with an amphiphilic fluoro compound as the transparent electrode of polymer solar cells", Energy Environ. Sci., 2012, 5, 5325-5332.

Wusheng Fan, et al., "Flexible films of poly(3,4-ethylenedioxythiophene)/carbon nanotube thermoelectric composites prepared by dynamic 3-phase interfacial electropolymerization and subsequent physical mixing", J. Mater. Chem. A, 2018,6, 12275-12280.

Shudi Lu, et al., "Qu, Recent Development in ITO-free Flexible Polymer Solar Cells", Polymers 2018, 10, 5; doi:10.3390/polym10010005.

* cited by examiner

[Figure 1]
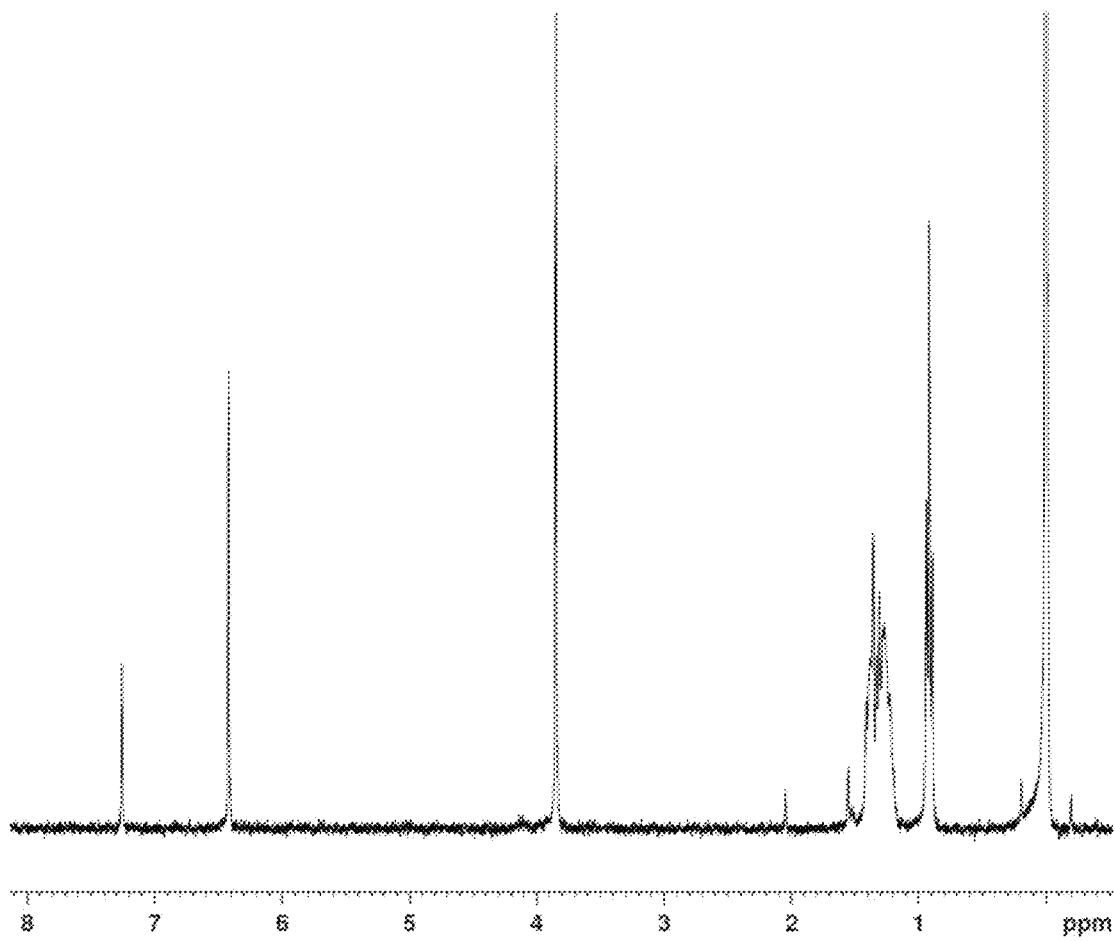

[Figure 2]
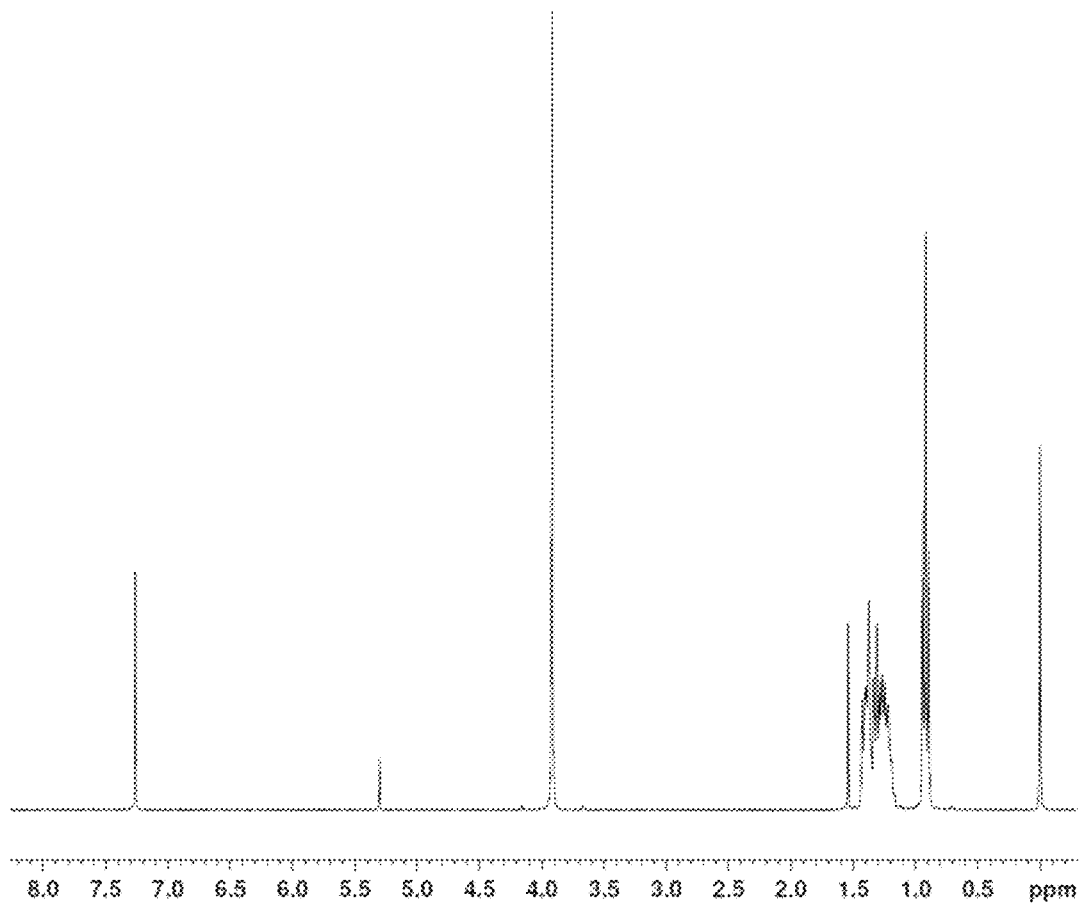

[Figure 3]
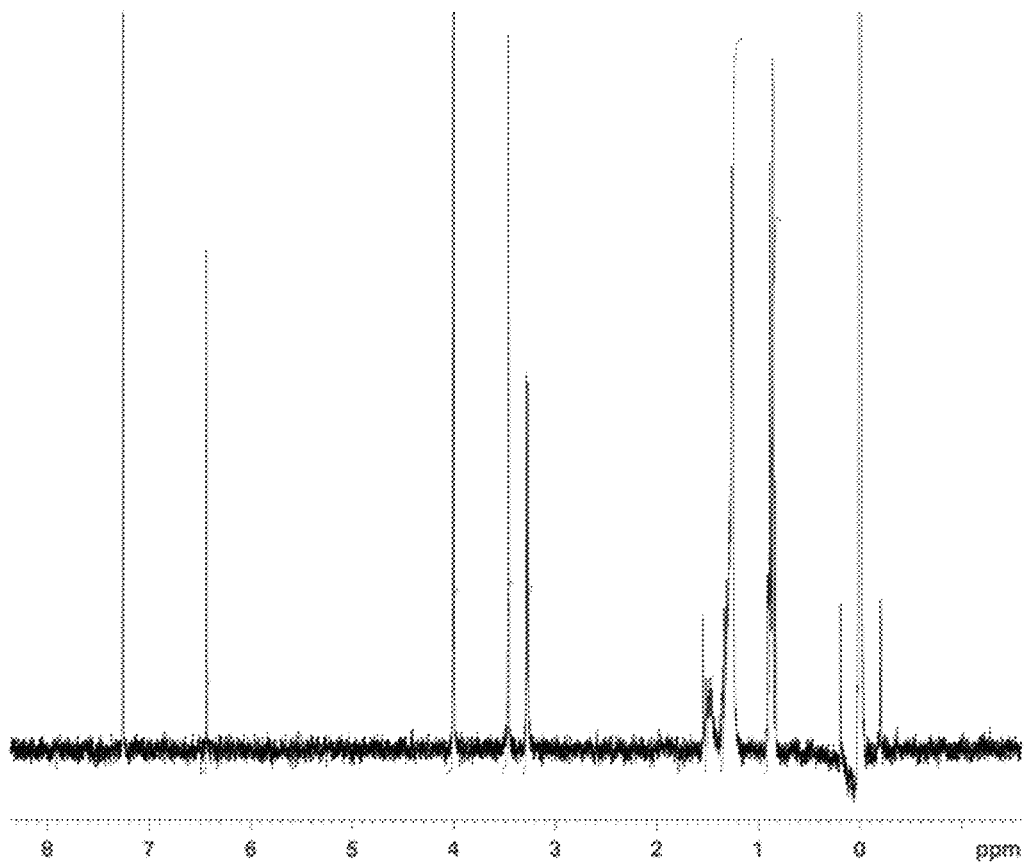

[Figure 4]
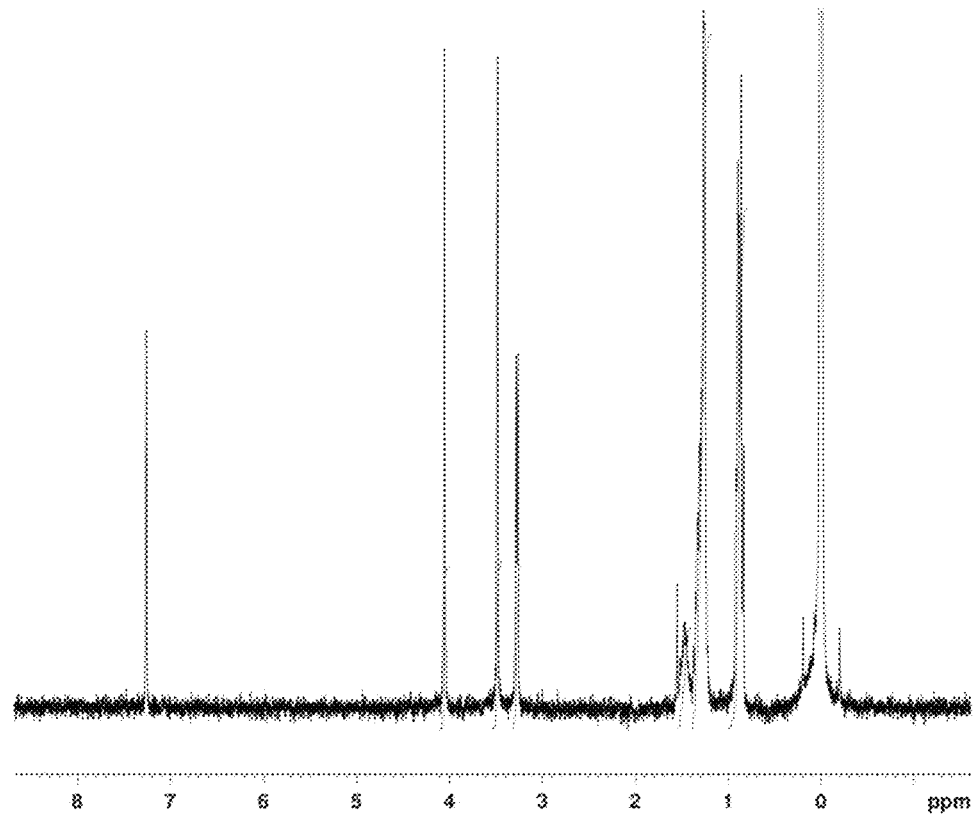

[Figure 5]
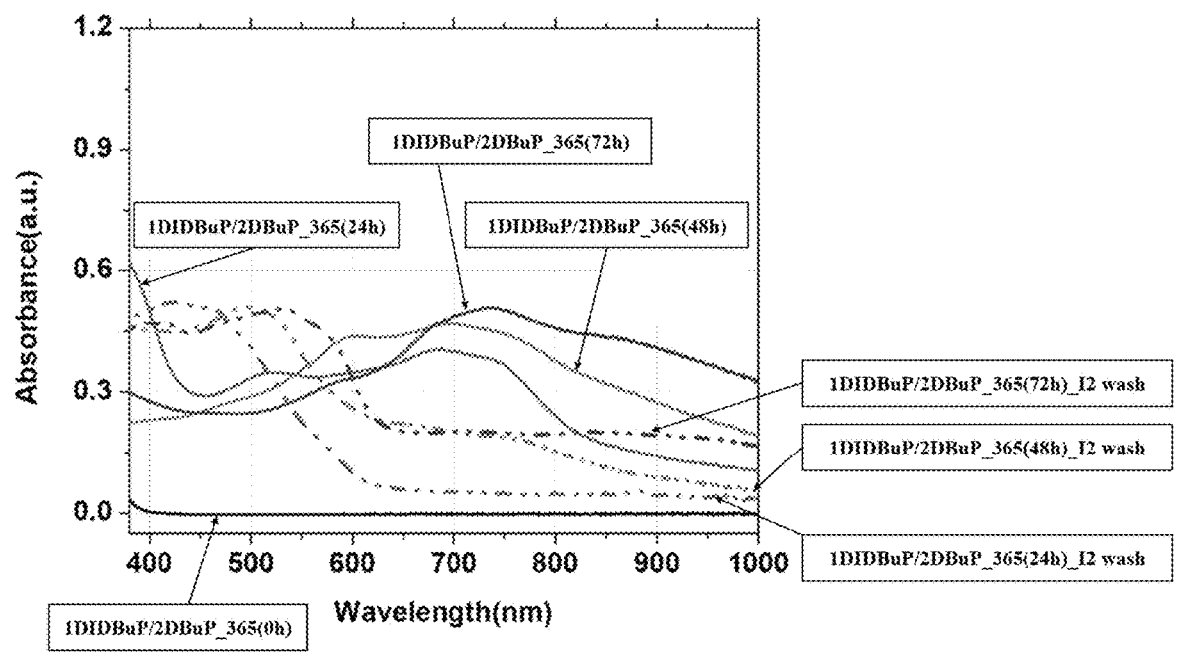

[Figure 6]
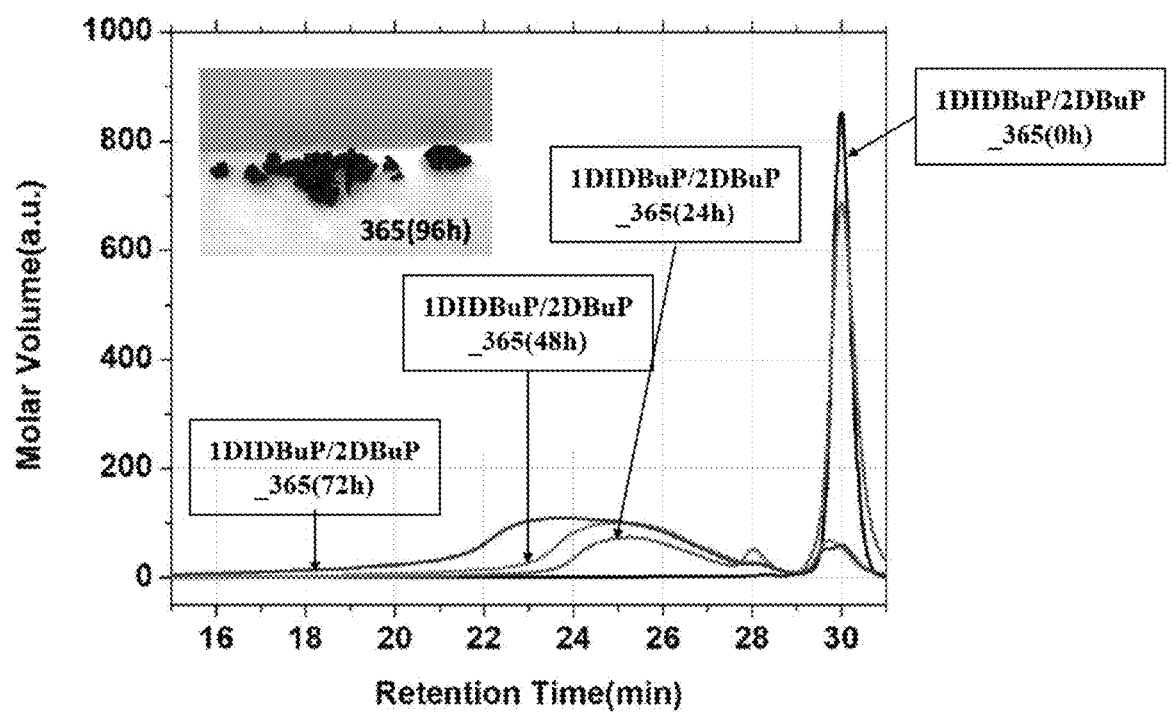

[Figure 7]
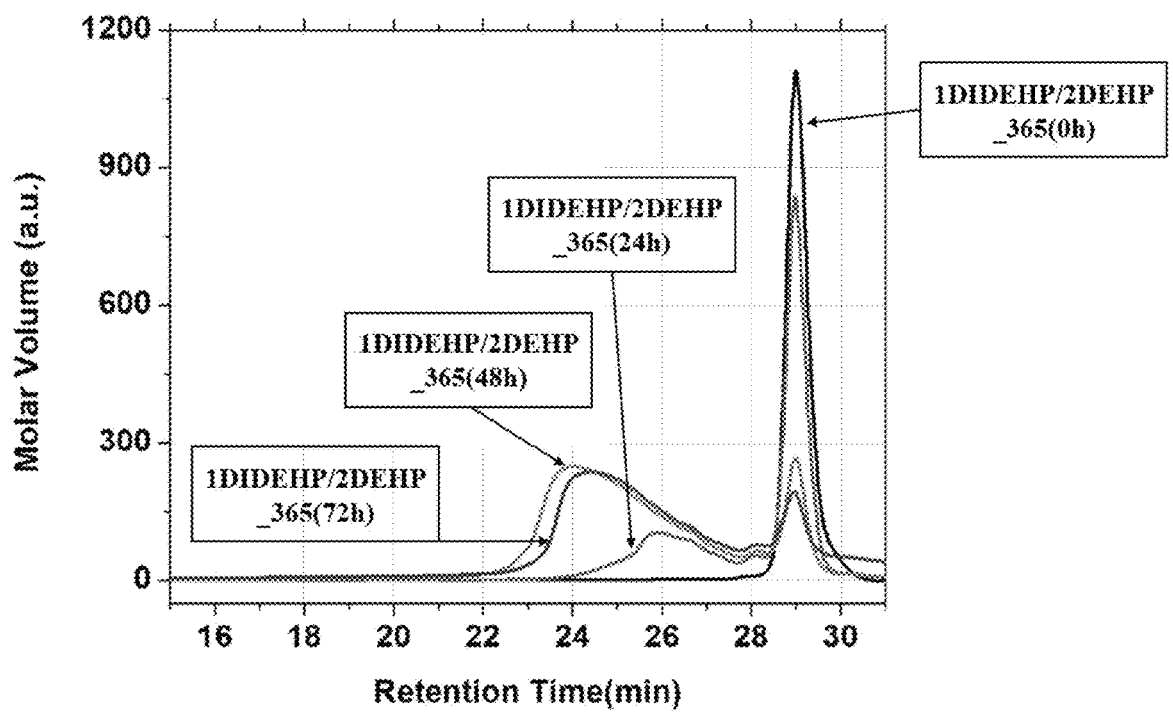

[Figure 8]
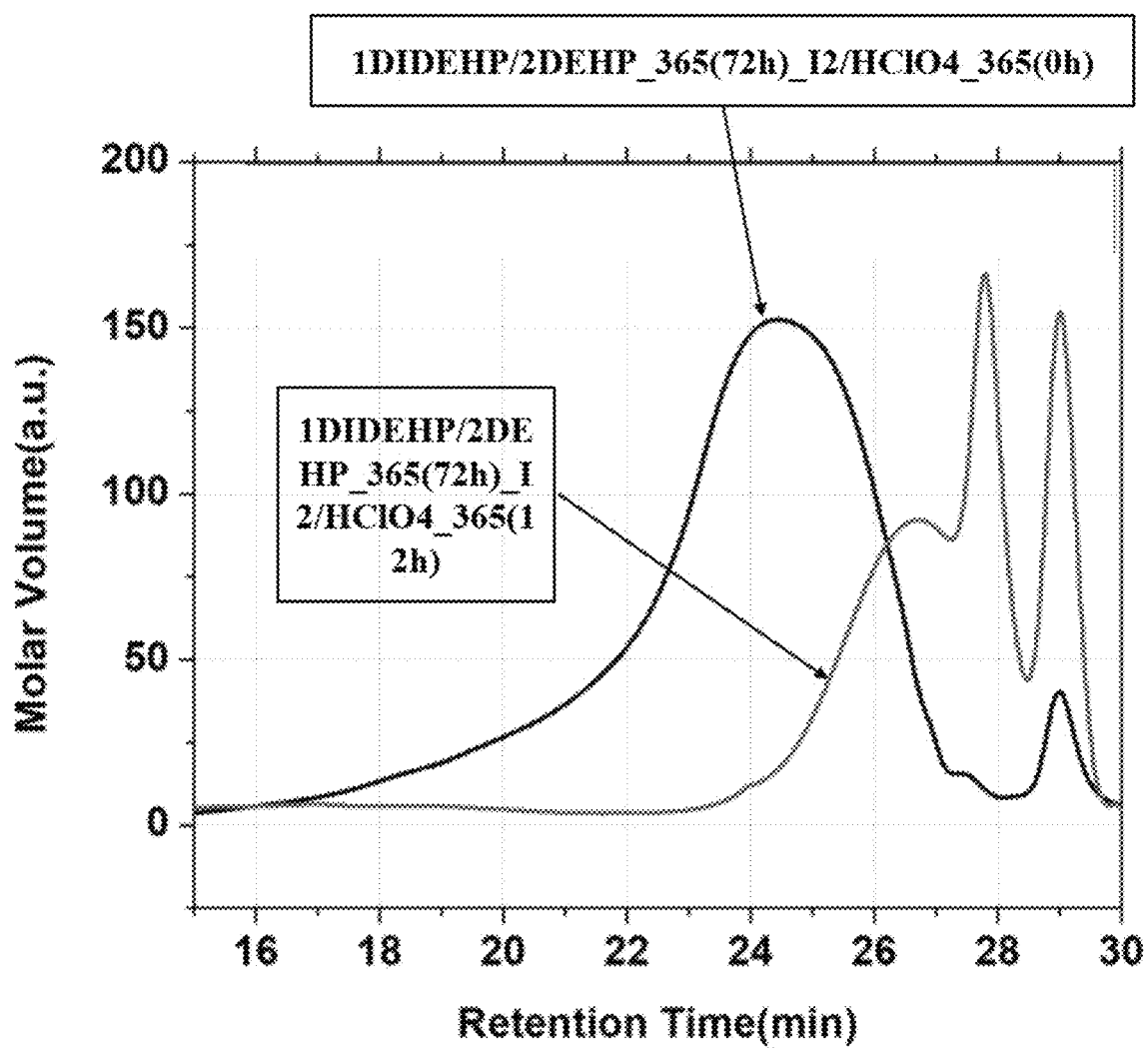

[Figure 9]
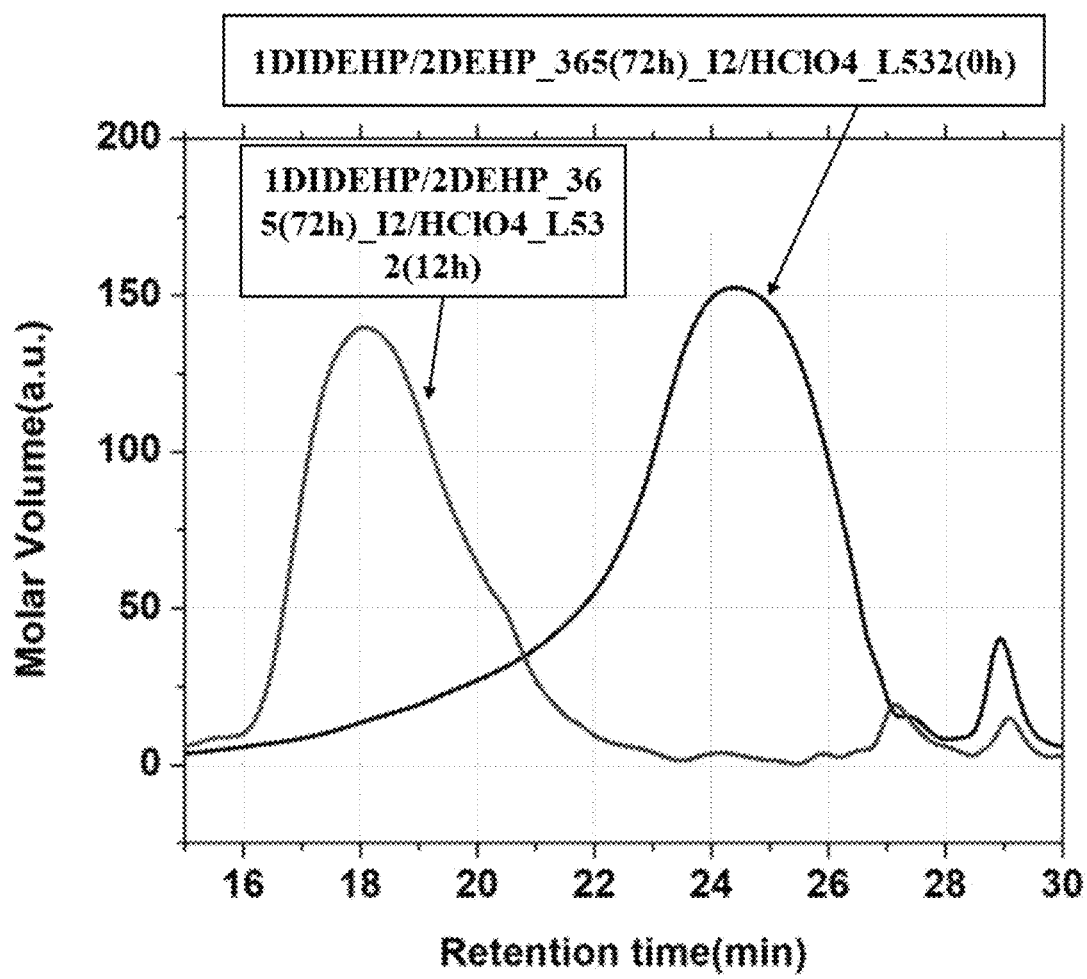

[Figure 10]
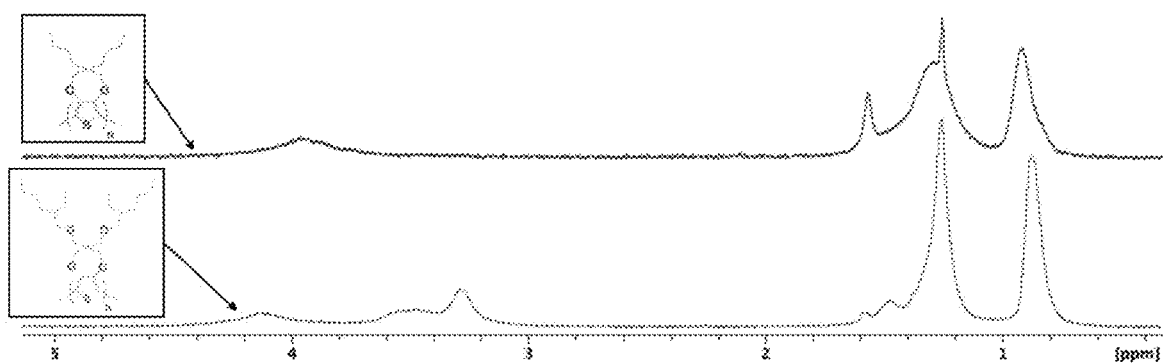

[Figure 11]
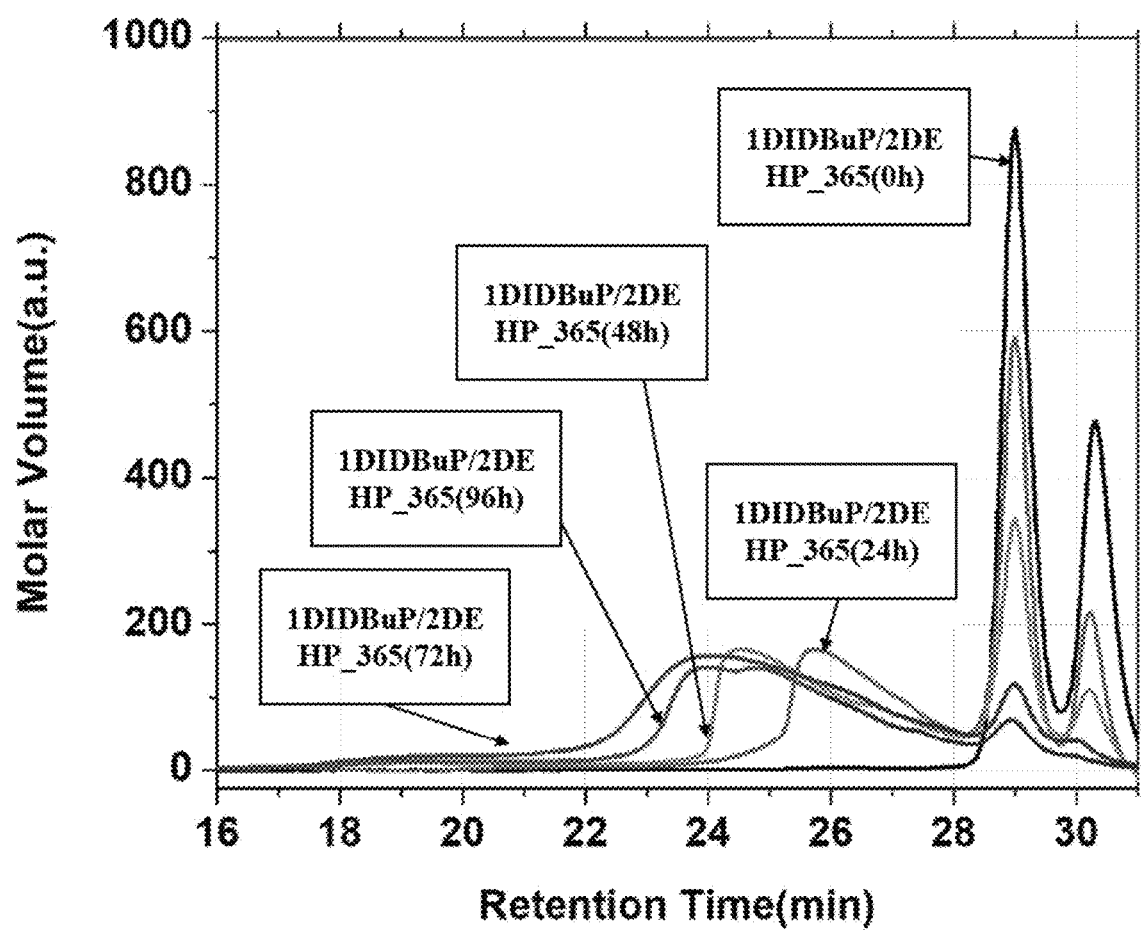

[Figure 12]
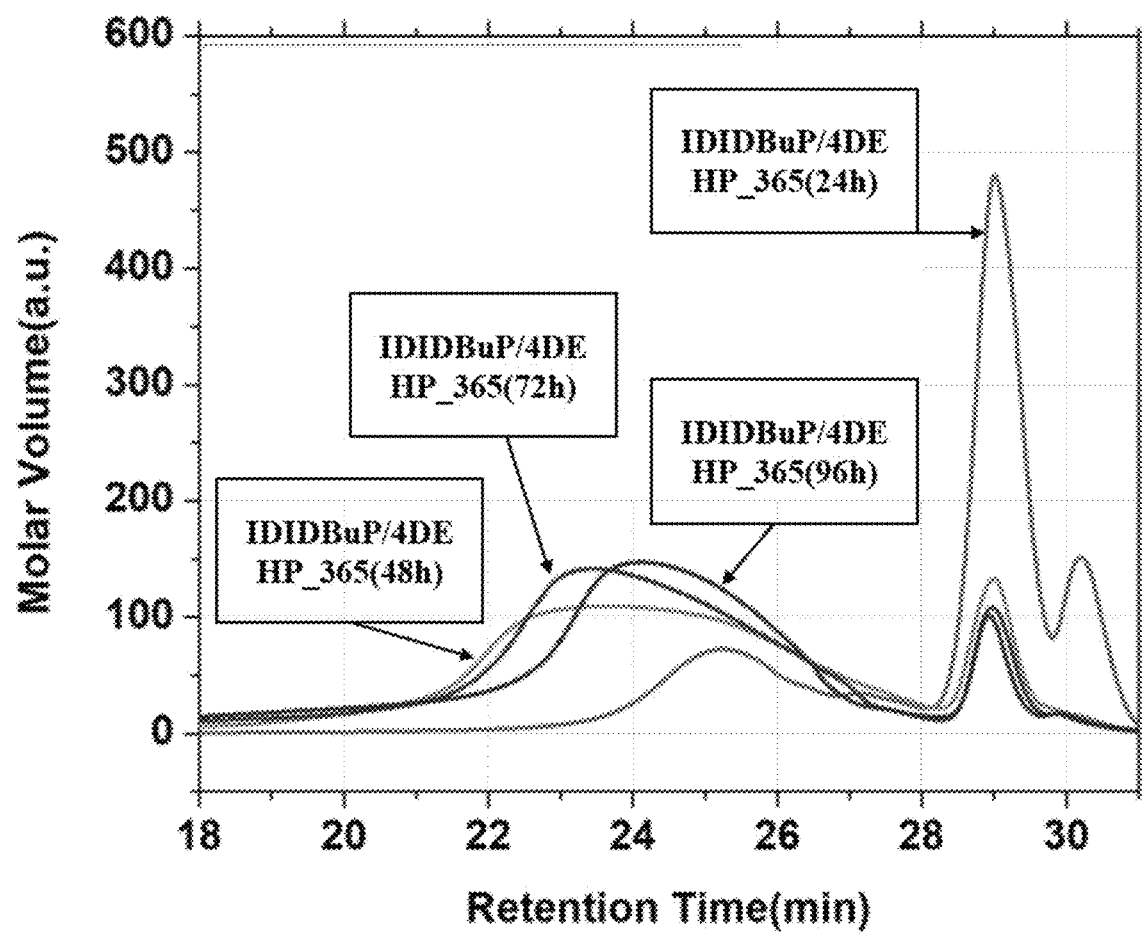

[Figure 13]
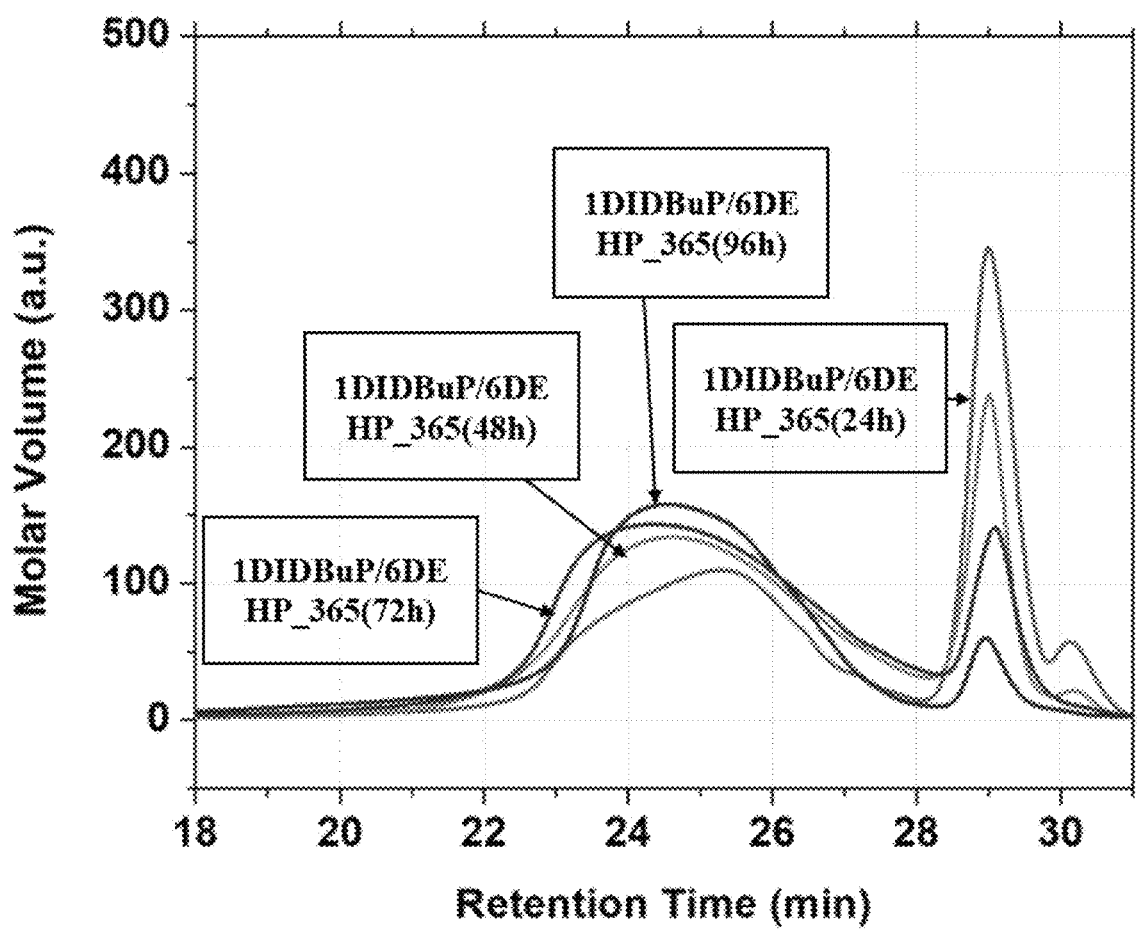

[Figure 14]
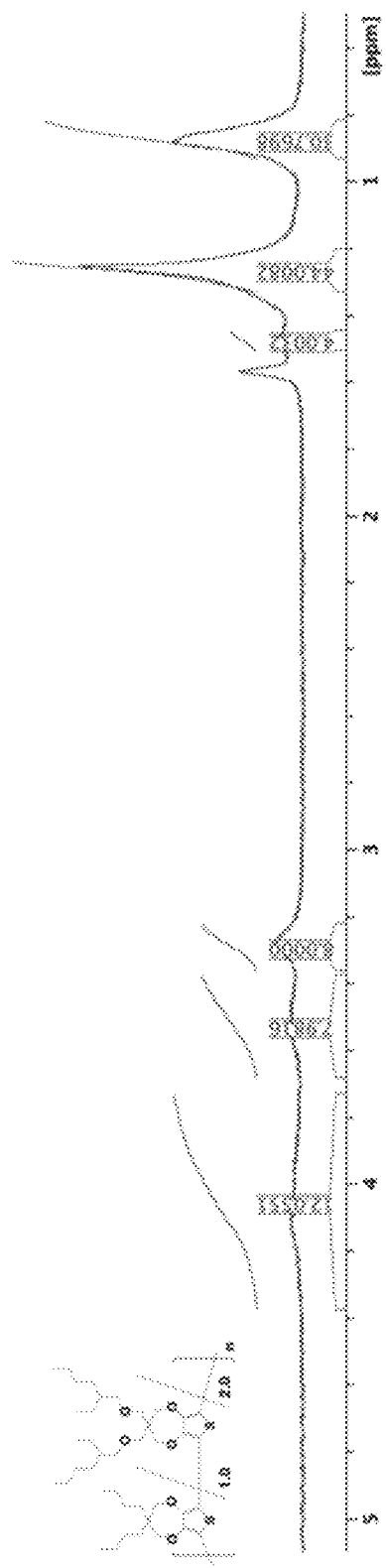

[Figure 15]
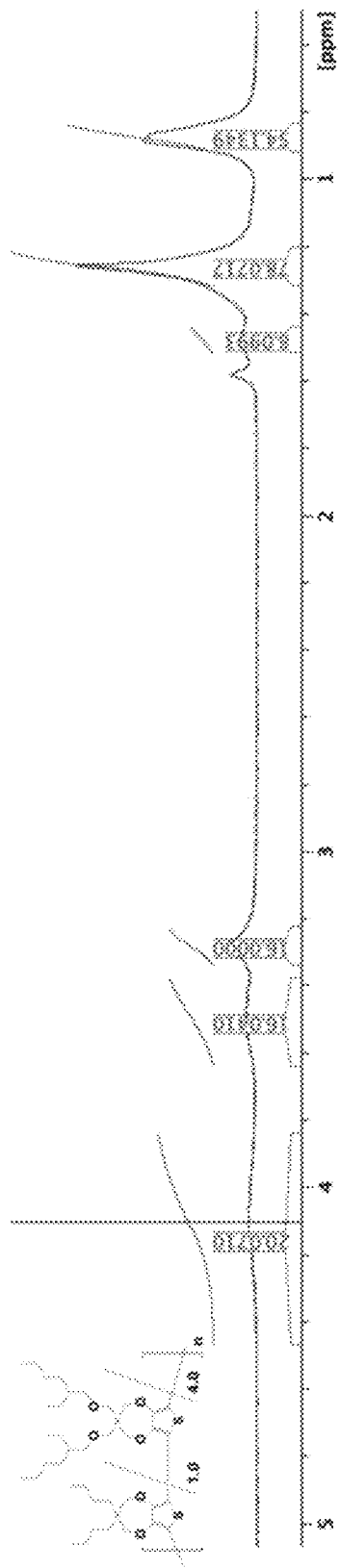

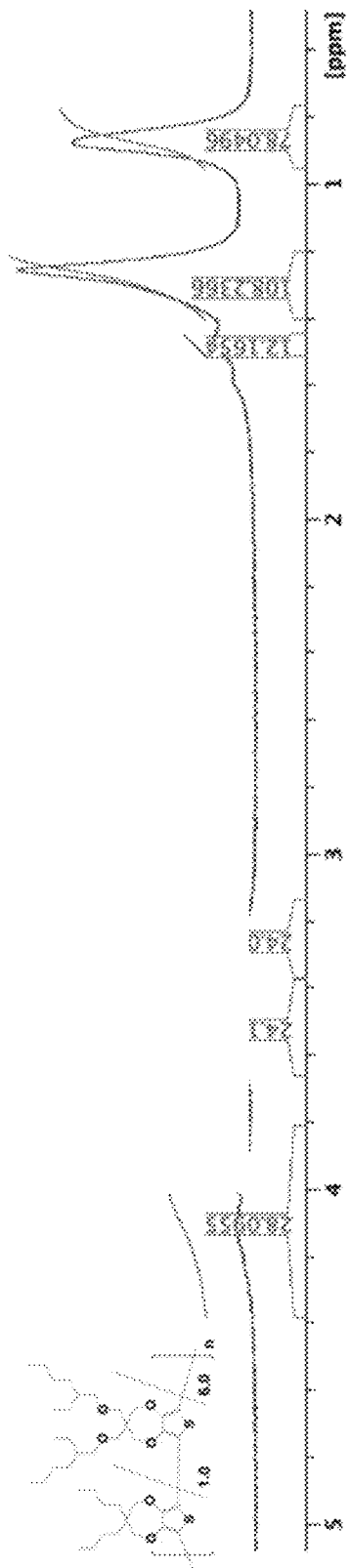
[Figure 16]

[Figure 17]
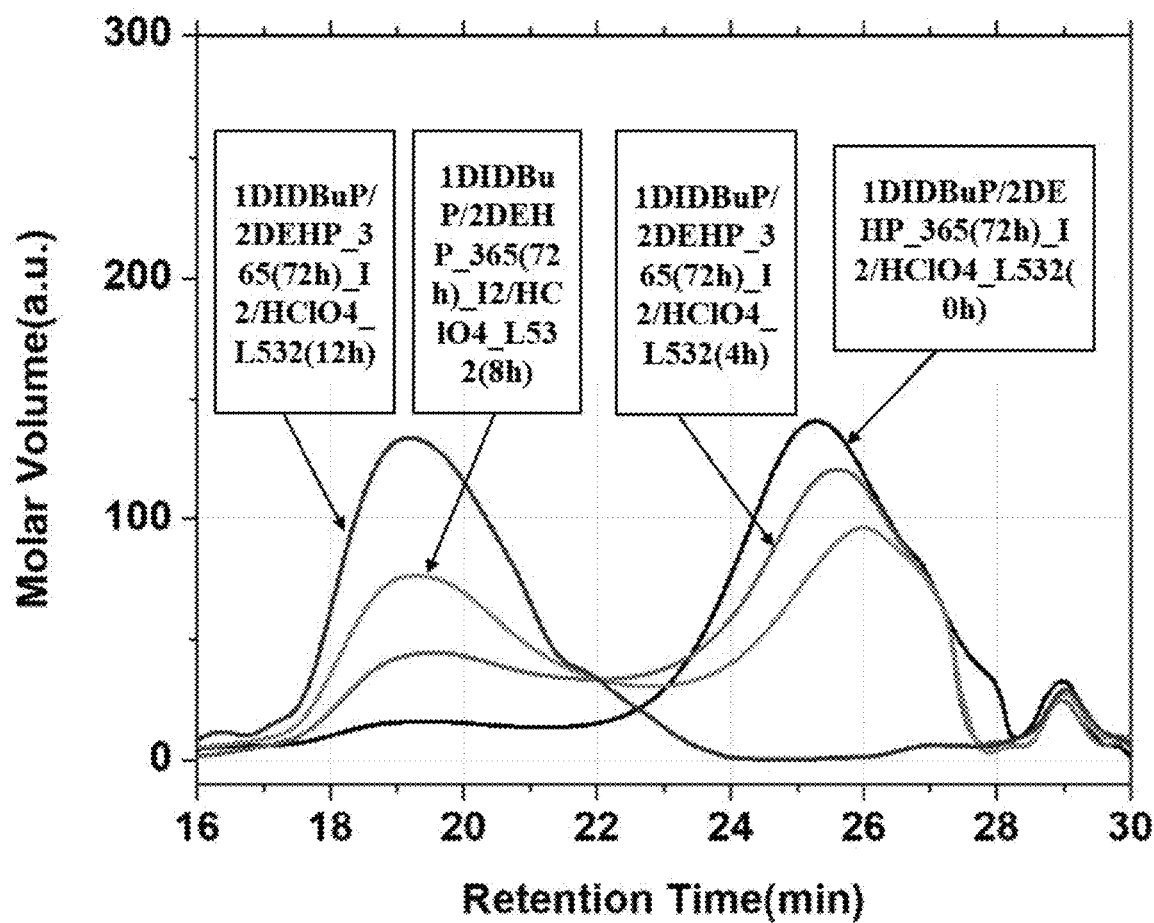

PREPARATION METHOD OF POLYMER

CROSS-REFERENCE TO RELATED APPLICATION

This application is a Divisional of U.S. patent application Ser. No. 16/808,011, filed Mar. 3, 2020, which is incorporated herein by reference in its entirety.

FIELD

The present application relates to a method for preparing a polymer and a polymer prepared by the preparation method.

BACKGROUND

Various methods of synthesizing polythiophene which is a conductive polymer are known, and representative methods are a method of using an oxidation reaction and a method of using a radical reaction.

In the method of using an oxidation reaction, thiophene monomers dissolved or dispersed in a solvent are oxidized, and then polythiophene is produced through a coupling reaction between the oxidized monomers. In this method, the polymerization is performed by adding an oxidant to a solvent and applying an external magnetic field thereto, but the polymer produced by the polymerization is in a doping state, and thus a phenomenon that polymerized chains tend to bind easily to each other occurs, whereby there is a problem that the solubility in the solvent is lowered as the polymerization proceeds. Accordingly, it is difficult to obtain a high molecular weight product because the product having a molecular weight of a certain level or more is precipitated.

A method for preparing a conductive polymer by applying a metal ligand catalyst is also known, and in this method, oxygen and water must not only be sufficiently removed during the polymerization process, but also their inflow must be blocked during the reaction, so that the process is complicated and it is also not easy to completely remove the applied catalyst after the polymer polymerization.

A method for preparing a polymer by inducing an oxidation reaction through light irradiation is also known, but in this method, it is also difficult to obtain a high molecular weight product, where a redox catalyst is required for polymerization, but it is also difficult to remove the catalyst in the product.

SUMMARY

The present application relates to a method for preparing a polymer, and a polymer. It is one object of the present application to provide a preparation method capable of preparing a desired polymer with excellent polymerization efficiency and conversion rates without consumption or modulation in the polymerization process. It is another object of the present application to provide a method for preparing a polymer having a large molecular weight of a desired level and exhibiting excellent solubility in various solvents. It is another object of the present application to provide a method for preparing a polymer, in which use of a catalyst is unnecessary or the use thereof can be minimized so that the amount of the catalyst in the product can be minimized or substantially eliminated. It is another object of the present application to provide a method for preparing a polymer that can easily achieve copolymerization between various kinds of monomers. It is another object of the present application to provide a polymer dispersion comprising the polymer thus prepared.

BRIEF DESCRIPTION OF THE DRAWINGS

FIG. 1 is $^1$H-NMR results for Synthesis Example 1, compound 1.

FIG. 2 is $^1$H-NMR results for Synthesis Example 2, compound 2.

FIG. 3 is $^1$H-NMR results for Synthesis Example 3, compound 3.

FIG. 4 is $^1$H-NMR results for Synthesis Example 4, compound 4.

FIG. 5 is UV-vis absorbance spectra of Example 1.

FIG. 6 is GPC analysis results of Example 1.

FIG. 7 is UV-vis spectra identified in Example 12.

FIG. 8 is GPC spectra data for Example 2.

FIG. 9 is further GPC spectra data for Example 2.

FIG. 10 is $^1$H-NMR results of a polymer formed in Example 2.

FIG. 11 is UV-vis absorbance spectra of Example 3.

FIG. 12 is UV-vis absorbance spectra of Example 4.

FIG. 13 is UV-vis absorbance spectra of Example 5.

FIG. 14 is $^1$H-NMR results of the polymers synthesized in Example 3.

FIG. 15 is $^1$H-NMR results of the polymers synthesized in Example 4.

FIG. 16 is $^1$H-NMR results of the polymers synthesized in Example 5.

FIG. 17 is GPC spectra data for Example 3.

DETAILED DESCRIPTION

Among physical properties mentioned in this specification, when the measured temperature and/or pressure affects the physical property value, the relevant physical property means a physical property measured at room temperature and/or normal pressure, unless otherwise specified.

In the present application, the term room temperature is a natural temperature without warming or cooling, which may mean, for example, any temperature in a range of about 10° C. to about 30° C., or a temperature of 25° C. or 23° C. or so.

In the present application, the term normal pressure is a pressure when it is not particularly reduced or increased, which may be about one atmosphere or so, usually, such as atmospheric pressure.

In one example, the method for preparing a polymer of the present application may be, for example, a method for preparing a conductive polymer, and may be, for example, a method for preparing polythiophene. In this specification, the term polythiophene means a polymer containing polymerized units of thiophene series monomers in an amount of about 50 mol % or more, 55 mol % or more, 60 mol % or more, 65 mol % or more, 70 mol % or more, 75 mol % or more, 80 mol % or more, 85 mol % or more, or 90 mol % or more, relative to the entire polymerized unit of the polymer. The upper limit of the polymerized unit ratio of the thiophene series monomers in the polythiophene is not particularly limited, which may be, for example, 100 mol % or less, 95 mol % or less, or about 90 mol % or less or so.

The thiophene series monomer may be represented by, for example, Formula 1 below.

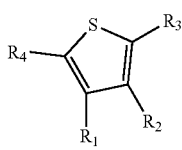

[Formula 1]

In Formula 1, $R_1$ and $R_2$ are each independently hydrogen, an alkyl group, an alkenyl group, an alkynyl group, an alkoxy group, an alkylcarbonyl group, an arylcarbonyl group, an arylcarbonyloxy group, an alkylcarbonyloxy group, a carboxyl group or an aryl group, or are linked to each other to form a ring structure, and $R_3$ and $R_4$ are each independently hydrogen, a halogen atom, an alkyl group, an alkenyl group, an alkynyl group, an alkoxy group or an aryl group, and at least one of $R_3$ and $R_4$ is a halogen atom.

In the present application, the term alkyl group, alkylene group or alkoxy group may mean a linear or branched alkyl group, alkylene group or alkoxy group, having 1 to 20 carbon atoms, 1 to 16 carbon atoms, 1 to 12 carbon atoms, 1 to 8 carbon atoms or 1 to 4 carbon atoms, or may mean a cyclic alkyl group, alkylene group or alkoxy group, having 3 to 20 carbon atoms, 3 to 16 carbon atoms, 3 to 12 carbon atoms, 3 to 8 carbon atoms or 3 to 6 carbon atoms, unless otherwise specified.

In the present application, the term alkenyl group, alkynylene group, alkynyl group or alkynylene group may mean a linear or branched alkenyl group or alkynyl group, having 2 to 20 carbon atoms, 2 to 16 carbon atoms, 2 to 12 carbon atoms, 2 to 8 carbon atoms or 2 to 4 carbon atoms, or may mean a cyclic alkenyl group or alkynyl group, having 3 to 20 carbon atoms, 3 to 16 carbon atoms, 3 to 12 carbon atoms, 3 to 8 carbon atoms or 3 to 6 carbon atoms, unless otherwise specified.

In this specification, the term aryl group or arylene group means a monovalent or divalent substituent derived from benzene or a derivative thereof; a compound in which two benzenes are bonded while sharing one or two carbon atoms, or a derivative thereof; a compound in which two benzenes are bonded by an arbitrary linker, or a derivative thereof, or a compound in which three or more benzene compounds are bonded, wherein the benzene compounds bonded to each other are bonded while sharing one or two carbon atoms with each other, or linked by an arbitrary linker, or a derivative thereof. The aryl group may be an aryl group or arylene group having 6 to 30 carbon atoms, 6 to 24 carbon atoms, 6 to 18 carbon atoms or 6 to 12 carbon atoms. The aryl group or arylene group may also be optionally substituted by one or more substituents.

The alkyl group, alkylene group, alkoxy group, alkenyl group, alkynylene group, alkynyl group, alkynylene group, arylene group and/or aryl group may also be optionally substituted with one or more substituents, where the substituent can be exemplified by a glycidyl group, a glycidoxyalkyl group, an acryloyl group, a methacryloyl group, an acryloyloxy group, a methacryloyloxy group, a hydroxy group, a carboxyl group, an epoxy group, an alkyl group, an alkylene group, an alkoxy group, an alkenyl group, an alkynylene group, an alkynyl group, an alkynylene group and/or an aryl group, and the like, but is not limited thereto.

At least one or two of $R_3$ and $R_4$ in Formula 1 is a halogen atom. The halogen atom included in Formula 1 can be exemplified by fluorine, chlorine, bromine or iodine, and the like, and it may be suitably iodine.

In the preparation method of the present application, a radical may be generated at $R_3$ and/or $R_4$ moiety which is the halogen atom, and subsequently the polymerization reaction may proceed.

In one example, $R_1$ and $R_2$ of Formula 1 may be linked to each other to form a ring structure. In this case, the monomer of Formula 1 above may be represented by Formula 2 below.

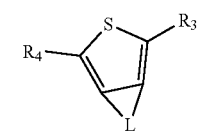

[Formula 2]

In Formula 2, $R_3$ and $R_4$ may be the halogen atoms, and L may be a chain forming the ring structure.

Here, the chain may have 3 to 10 chain forming atoms. Chain forming atoms are atoms forming a chain of L, and an example thereof includes carbon, oxygen, nitrogen or sulfur, where in a suitable example, it may be carbon or oxygen. In defining the number of chain forming atoms, atoms other than the atoms present at the sites forming the chain are not considered. For example, the chain may also be optionally substituted by one or more substituents, and in this case, the number of atoms present in the substituent is not included in the number of chain forming atoms, and when the chain forming atom is carbon or nitrogen to which hydrogen atoms are boned, the hydrogen atoms are not counted as chain forming atoms. In addition, when two or more of oxygen or sulfur each exist as the chain forming atoms, the oxygen or sulfur does not exist adjacent to each other in the chain structure.

In the compound of Formula 1 above, at least one of $R_1$ and $R_2$ may be a substituent including an oxygen atom, or the ring structure formed by linking $R_1$ and $R_2$ of Formula 1 may contain an oxygen atom.

That is, in Formula 1, at least one or both of $R_1$ and $R_2$ may be an alkoxy group, an alkylcarbonyl group, an arylcarbonyl group, an arylcarbonyloxy group, an alkylcarbonyloxy group or a carboxyl group, which may be, suitably, an alkoxy group.

In addition, when $R_1$ and $R_2$ in Formula 1 are linked to each other to form a ring structure, the chain by $R_1$ and $R_2$ forming a ring structure (for example, L in Formula 2) may contain at least an oxygen atom. In this case, the number of oxygen atoms included in the chain is one, or 2 or more, and the upper limit thereof is not particularly limited, but is, for example, 10 or less, 9 or less, 8 or less, 7 or less, 6 or less, 5 or less, 4 or less, 3 or less, or 2 or less. In addition, when two or more oxygen atoms exist in the chain, the relevant oxygen and oxygen may not be adjacent to each other. In other words, for example, a carbon or nitrogen atom may be present between the two or more oxygen atoms, and suitably, a carbon atom may be present.

In a suitable example, the chain by $R_1$ and $R_2$ may have 3 to 10 chain forming atoms, where the chain forming atom is carbon or oxygen, but at least one or 2 to 5, 2 to 4, 2 to 3 or 2 chain forming atoms may be oxygen atoms which are not adjacent to each other.

As the compound having such a form lowers the oxidation potential of the compound by unshared electron pairs of the oxygen atom, the polymerization reaction can proceed more effectively.

For example, the monomer of Formula 1 above including oxygen atoms may be represented by any one of Formulas 3 to 5 below.

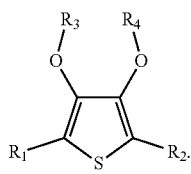

[Formula 3]

In Formula 3, $R_3$ and $R_4$ are each independently hydrogen, an alkyl group, an alkenyl group, an alkynyl group, an alkylcarbonyl group, an arylcarbonyl group or an aryl group, or are linked to each other to form a ring structure, and $R_1$ and $R_2$ are each independently hydrogen, a halogen atom, an alkyl group, an alkenyl group, an alkynyl group, an alkoxy group or an aryl group, and at least one of $R_1$ and $R_2$ is a halogen atom.

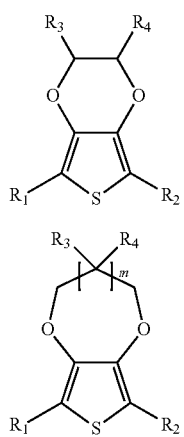

[Formula 4]

[Formula 5]

In Formula 4 or 5, $R_3$ and $R_4$ are each independently hydrogen, an alkyl group, an alkenyl group, an alkynyl group, an alkoxy group, an alkylcarbonyl group, an arylcarbonyl group, an arylcarbonyloxy group, an alkylcarbonyloxy group, a carboxyl group or an aryl group, $R_1$ and $R_2$ are each independently hydrogen, a halogen atom, an alkyl group, an alkenyl group, an alkynyl group, an alkoxy group or an aryl group, at least one of $R_1$ and $R_2$ is a halogen atom, and m is a number in a range of 1 to 4.

In Formula 3, $R_3$ and $R_4$ may be, suitably, an alkyl group, an alkenyl group, an alkynyl group or an aryl group, or an alkyl group, and in Formulas 3 to 5, suitable examples for $R_1$ and $R_2$ are the same as $R_3$ and $R_4$ in Formula 1.

As the thiophene series monomers to be applied to the polymerization process in the present application, all the above-described monomers are monomers containing a halogen atom, which may serve as an initiator or a radical generating source of the polymerization process. In one example, the thiophene series monomer applied in the polymerization process of the present application may be a mixture of a monomer containing a halogen atom and a monomer containing no halogen atom. By applying such a monomer composition, the reaction can be controlled so that a photoarylation mechanism is superior to a photocondensation mechanism in the polymerization mechanism, and as a result, it is possible to form a high molecular weight conductive polymer more effectively.

Thus, in one example, the mixture applied to the polymerization process may comprise a non-halogenated thiophene series monomer, which may be, for example, a compound of Formula 6 below.

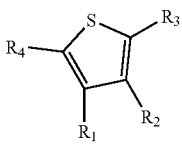

[Formula 6]

In Formula 6, $R_1$ and $R_2$ are each independently hydrogen, an alkyl group, an alkenyl group, an alkynyl group, an alkoxy group, an alkylcarbonyl group, an arylcarbonyl group, an arylcarbonyloxy group, an alkylcarbonyloxy group, a carboxyl group or an aryl group, or are linked to each other to form a ring structure, and $R_3$ and $R_4$ are each independently hydrogen, an alkyl group, an alkenyl group, an alkynyl group, an alkoxy group or an aryl group, and at least one of $R_3$ and $R_4$ is a hydrogen atom.

The details for such non-halogenated monomers are the same as the details described for the halogenated monomers, except that they contain no halogen.

For example, in Formula 6, at least one or two of $R_3$ and $R_4$ are hydrogen atoms other than halogen atoms.

Furthermore, in one example, when $R_1$ and $R_2$ of Formula 6 are linked to each other to form a ring structure, the monomer of Formula 6 may be represented by Formula 7 below.

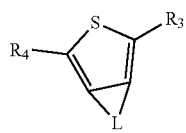

[Formula 7]

In Formula 7, $R_3$ and $R_4$ may be the hydrogen atoms, and L may be a chain forming the ring structure, where the details for the chain are the same as in the case of Formula 2.

In the compound of Formula 6 above, at least one of $R_1$ and $R_2$ may be a substituent including an oxygen atom, or the ring structure formed by linking $R_1$ and $R_2$ of Formula 1 may include an oxygen atom. That is, in Formula 6, at least one or both of $R_1$ and $R_2$ may be an alkoxy group, an alkylcarbonyl group, an arylcarbonyl group, an arylcarbonyloxy group, an alkylcarbonyloxy group or a carboxyl group, and may be, suitably, an alkoxy group.

In addition, when $R_1$ and $R_2$ in Formula 6 are linked to each other to form a ring structure, the chain by $R_1$ and $R_2$ forming a ring structure (for example, L in Formula 2) may contain at least an oxygen atom. In this case, the number of oxygen atoms included in the chain is one, or 2 or more, and the upper limit thereof is not particularly limited, but is, for example, 10 or less, 9 or less, 8 or less, 7 or less, 6 or less, 5 or less, 4 or less, 3 or less, or 2 or less. In addition, when two or more oxygen atoms exist in the chain, the relevant oxygen and oxygen may not be adjacent to each other. In other words, for example, a carbon or nitrogen atom may be present between the two or more oxygen atoms, and suitably, a carbon atom may be present. In a suitable example, the chain by $R_1$ and $R_2$ may have 3 to 10 chain forming atoms, where the chain forming atom is carbon or oxygen, but at least one or 2 to 5, 2 to 4, 2 to 3 or 2 chain forming atoms may be oxygen atoms which are not adjacent to each other. The advantages of the compound having such a form are as described above.

For example, the monomer of Formula 6 including oxygen atoms may be represented by any one of Formulas 8 to 10 below.

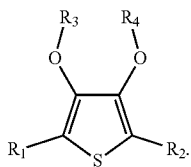

[Formula 8]

In Formula 8, $R_3$ and $R_4$ are each independently hydrogen, an alkyl group, an alkenyl group, an alkynyl group, an alkylcarbonyl group, an arylcarbonyl group or an aryl group, or are linked to each other to form a ring structure, and $R_1$ and $R_2$ are each independently hydrogen, an alkyl group, an alkenyl group, an alkynyl group, an alkoxy group or an aryl group, and at least one of $R_1$ and $R_2$ is a hydrogen atom.

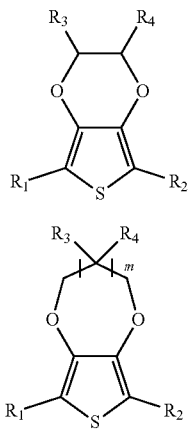

[Formula 9]

[Formula 10]

In Formula 9 or 10, $R_3$ and $R_4$ are each independently hydrogen, an alkyl group, an alkenyl group, an alkynyl group, an alkoxy group, an alkylcarbonyl group, an arylcarbonyl group, an arylcarbonyloxy group, an alkylcarbonyloxy group, a carboxyl group or an aryl group, $R_1$ and $R_2$ are each independently hydrogen, an alkyl group, an alkenyl group, an alkynyl group, an alkoxy group or an aryl group, at least one of $R_1$ and $R_2$ is a hydrogen atom, and m is a number in a range of 1 to 4.

In Formula 8, $R_3$ and $R_4$ may be, suitably, an alkyl group, an alkenyl group, an alkynyl group or an aryl group, or an alkyl group, and in Formulas 8 to 10, suitable examples for $R_1$ and $R_2$ are the same as $R_3$ and $R_4$ in Formula 1.

As above, when the mixture of the halogenated thiophene monomer and the non-halogenated thiophene monomer is applied as the monomer, the ratio between them is not particularly limited. For the proper progress of polymerization, for example, based on the compounds of Formulas 1 and 6, the ratio (Halo/(Halo+H)) of the molar number (Halo) of halogen atoms contained in $R_3$ and $R_4$ of Formula 1 and the molar number (H) of hydrogen atoms contained in $R_3$ and $R_4$ of the compound of Formula 6 may be in a range of 0.001 to 99. In another example, the ratio (Halo/(Halo+H)) may be about 0.01 or more, 0.05 or more, 0.1 or more, 0.15 or more, 0.2 or more, 0.25 or more, 0.3 or more, 0.35 or more, 0.4 or more, 0.45 or more, or 0.5 or more, or may be 95 or less, 90 or less, 85 or less, 80 or less, 75 or less, 70 or less, 65 or less, 60 or less, 55 or less, 50 or less, 45 or less, 40 or less, 35 or less, 30 or less, 25 or less, 20 or less, 15 or less, or 10 or less. In this range, the polymerization can be performed effectively to obtain a high molecular weight product.

Among the matters on the molar number ratios of halogen atoms and hydrogen atoms based on the compounds of Formulas 1 and 6, the matter on the molar number ratios of halogen atoms and hydrogen atoms based on $R_3$ and $R_4$ of Formulas 1 and 6 is equally applied to halogen atoms and hydrogen atoms of $R_3$ and $R_4$ in Formulas 2 and 7, and equally applied to halogen atoms and hydrogen atoms of $R_1$ and $R_2$ in Formulas 3 to 5 and Formulas 8 to 10.

That is, in the entire thiophene-based monomer that the polymerization reaction proceeds, the ratio (Halo/(Halo+H)) of the molar number (Halo) of halogen atoms included in $R_3$ and $R_4$ of Formulas 1 and/or 2, and/or $R_1$ and $R_2$ of Formulas 3 to 5, and the molar number (H) of hydrogen atoms included in $R_3$ and $R_4$ of the compound of Formulas 6 and/or 7, and/or $R_1$ and $R_2$ of Formulas 8 to 10 may satisfy the above range.

The preparation method of the present application may comprise a step of irradiating it with light in a state where such a thiophene series monomer is dissolved in a solvent.

In this process, a radical is generated at the site where the halogen atom of the thiophene series monomer is present, and a chain reaction may occur to generate a polymer. If necessary, other monomers may also be present in the solvent in addition to the thiophene series monomer.

Therefore, the preparation method of the present application comprises a step of irradiating a mixture containing a monomer of Formula 1 above as the thiophene series monomer and a solvent with light.

In a first aspect of the present application, as the solvent applied in the preparation method, a solvent containing no hydrogen atom may be applied.

The inventors of the present application have found that solvents containing a hydrogen atom absorb halogen radicals and/or halogen molecules generated in the polymerization process. When such halogen radicals and/or halogen molecules generated in the polymerization process are absorbed and exhausted by the solvent, it is difficult to generate radicals with activity, and thus no reaction between a monomer or a macromolecule produced by the polymerization and other monomers is additionally performed, so that the desired high molecular weight product cannot be obtained. In one aspect of the present application, by applying a solvent containing no hydrogen atom as the solvent, it is possible to prevent the exhaustion of halogen radicals and/or halogen molecules.

In a second aspect of the present application, the step of irradiating the mixture comprising the solvent and the thiophene series monomer with light may be performed in at least two steps. For example, the step of irradiating the mixture with light may comprise a first step of irradiating the mixture with light having a wavelength of 450 nm or less and a second step of irradiating it with light having a wavelength of more than 450 nm.

For example, the first and second steps may be performed continuously without interruption, or after performing the first step and stopping the light irradiation for a predetermined time, the second step of irradiating it with light having a wavelength of more than 450 nm may be performed at an appropriate time point. In addition, while the second step is performed, only the light having a wavelength of more than 450 nm may be irradiated, or the light having a wavelength of 450 nm or less may also be irradiated together with the light.

In another example, the wavelength of the light irradiated in the first step may be 100 nm or more, 150 nm or more, 200 nm or more, 250 nm or more, 300 nm or more, or 350 nm or more, or may also be 400 nm or less or so.

Furthermore, in another example, the wavelength of the light irradiated in the second step may be about 900 nm or less, 850 nm or less, 800 nm or less, 750 nm or less, 700 nm or less, 650 nm or less, 600 nm or less, or 550 nm or less, or may also be 460 nm or more, 480 nm or more, or 500 nm or more or so.

For generating radicals in the polymerization process of the preparation method of the present application and forming the desired polymer having a high molecular weight through a chain reaction by the radicals, it is required that the irradiated light is absorbed by a monomer or a macromolecule formed by polymerization of the monomer to generate radicals in a chain reaction. However, the wavelength of the light that the monomer efficiently absorbs and the wavelength of the light that the macromolecule formed by polymerizing the monomers absorbs are different from each other, and thus if the light of the same wavelength is continuously irradiated in the polymerization process, at least one radical generation efficiency is lowered, so that it is not easy to produce a polymer having a desired molecular weight.

The inventors of the present application have confirmed that they can solve the problem and produce the desired polymer by performing the first step for an appropriate time and then changing the wavelength of the irradiated light or further irradiating it with another light to perform the second step.

The methods of the two aspects of the present application may be performed simultaneously with each other, or may be performed independently of each other. That is, in the preparation method of applying the specific solvent (solvent containing no hydrogen atom), the light irradiation may or may not proceed in two steps described above, and in the method that the light irradiation is divided in two steps and proceeds, the solvent containing no hydrogen atom may or may not be used.

Appropriately, the two aspects are applied simultaneously, whereby the desired polymer can be formed more efficiently.

Through such a method, the present application can produce a polymer having a high molecular weight of a desired level with excellent polymerization efficiency and conversion rates without generation of by-products or alteration of a target in the polymerization process. In the present application, the polymer is produced by chain polymerization by radicals, and thus excessive doping does not occur due to halogen anions of the polymer as in an oxidation method using an oxidant, whereby the polymer can exhibit excellent solubility in various solvents. In addition, the preparation method of the present application can form a desired polymer without requiring the use of a catalyst or while applying only a small amount, if necessary, so that there is no or a small amount of catalyst in the final product, whereby the desired polymer can be obtained with high purity without any additional process for separating the catalyst. According to the preparation method of the present application, various monomers forming a polymer by the radical reaction can be easily applied in addition to the thiophene series monomer to easily and efficiently produce a copolymer of the thiophene series monomer and another monomer.

In both the preparation methods of the first and second aspects in the present application, the step of irradiating a mixture of a solvent and a thiophene-based monomer with light is performed. In this process, the ratio of the thiophene-based monomer in the mixture is not particularly limited, and the thiophene-based monomer may be applied at an appropriate ratio in consideration of the desired polymer. In one example, the thiophene-based monomer may have a concentration in a range of about 0.01 mol/L to 1 mol/L. The concentration of the thiophene-based monomer may be the concentration of the monomer in the solvent. In another example, the concentration may be about 0.05 mol/L or more, 0.1 mol/L or more, 0.15 mol/L or more, 0.2 mol/L or more, 0.25 mol/L or more, 0.3 mol/L or more, 0.35 mol/L or more, 0.4 mol/L or more, 0.45 mol/L or more, or 0.5 mol/L or more. In this range, the effective polymerization of the monomers can be induced, and the solubility of the polymerized polymer can also be stably maintained.

As described above, in the method for preparing a polymer of the present application, it is possible to prevent consumption of halogen radicals and halogen molecules by not applying a solvent having a hydrogen atom. Therefore, the mixture in the preparation method of the first aspect comprises only the solvent without any hydrogen atom as the solvent, and may be substantially free of the solvent having a hydrogen atom. Here, the fact that does not substantially apply the solvent having a hydrogen atom may mean the case where the ratio of the solvent having a hydrogen atom in the mixture is about 1 weight % or less, 0.5 weight % or less, 0.1 weight % or less, 0.05 weight % or less, 0.01 weight % or less, 0.005 weight % or less, 0.001 weight % or less, 0.0005 weight % or less, 0.0001 weight % or less, 0.00005 weight % or less, or 0.00001 weight % or less or so. In addition, the lower limit of the ratio of the solvent is 0 weight %.

As the solvent without any hydrogen atom, various solvent can be applied without any particular limitation as long as it contains no hydrogen atom. Such a solvent can be exemplified by bromotrichloromethane ($CBrCl_3$), tetrachloromethane ($CCl_4$) or dibromodichloromethane ($CBr_2Cl_2$), and the like, but is not limited thereto.

In the preparation method of the present application, any one of the above solvents may be selected, and if necessary, a mixed solvent of two or more may also be applied.

In the preparation method of the present application, when the light irradiation is divided in two steps and performed, the time for which each step is applied is not particularly limited. In one example, the first step may be performed at a level such that the total energy by the irradiated light is about 0.01 W/cm² to 20 W/cm² or so. If the total energy is too small, radical formation does not occur efficiently, whereas if the total energy is too high, photodegradation may occur in a product or the like, so that it can be adjusted to an appropriate range in consideration of this.

In the second step, the total energy by the irradiated light may be adjusted to a level similar to that of the first step, and if the total energy is too small, radical formation does not occur efficiently, whereas if it is too high, photodegradation may occur in a product or the like, so that it can be adjusted to an appropriate range in consideration of this. On the other hand, when the light irradiated in the second step is pulsed light to be described below, the total energy is average energy.

The light irradiation performed in the second step may proceed using a pulsed light source, for example, a pulsed laser light source. When light having such a long wavelength is subjected to pulse irradiation, the polymerization can be stably performed while effectively preventing photodegradation by the irradiated light. In this case, the frequency of the pulsed light source may be adjusted in a range of about 1 to 20 Hz or so. In another example, the frequency may be about 2 Hz or more, 3 Hz or more, 4 Hz or more, 5 Hz or more, 6 Hz or more, 7 Hz or more, 8 Hz or more, 9 Hz or more, or 10 Hz or more, or may also be about 19 Hz or less, 18 Hz or less, 17 Hz or less, 16 Hz or less, 15 Hz or less, 14 Hz or less, 13 Hz or less, 12 Hz or less, 11 Hz or less, or 10 Hz or less or so.

According to one example of the present application, when the first and second steps are performed together, a step of additionally supplying a halogen source at an appropriate time (for example, between the first step and the second step) may further be performed.

While this step maintains or improves the radical generation efficiency, the polymerization process can be performed more effectively. As the halogen source, a known compound may be applied without particular limitation, which may be exemplified by, for example, fluorine molecules ($F_2$), chlorine molecules ($Cl_2$), bromine molecules ($Br_2$) or iodine molecules ($I_2$), and the like, and may be, suitably, iodine molecules ($I_2$). In addition, the supply of halogen can be performed more smoothly by adding perchloric acid ($HClO_4$) and the like together with the halogen molecules.

In the preparation method of the present application, a polymer having desired molecular weight characteristics and solubility in a solvent can be formed with excellent polymerization efficiency through such a method without using a separate catalyst or other components.

The present application also relates to a polymer dispersion comprising a polymer prepared in such a manner and a solvent.

For example, the polymer may comprise a polymerized unit of Formula 11 below as the polymerized unit formed by the thiophene-based monomer of Formulas 1 and/or 6 above.

The polymerized unit of Formula 11 below is a polymerized unit formed by linking $R_3$ and $R_4$ moieties to each other in Formulas 1 and/or 6 above. Therefore, specific matters for $R_1$ and $R_2$ in Formula 11 below are the same as the matters for $R_1$ and $R_2$ in Formulas 1 and 6 above.

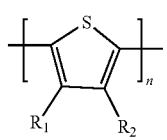

[Formula 11]

Also, in Formula 11, n represents a degree of polymerization of the thiophene-based monomer, and is any number, which may be, for example, a number in a range of about 4 to 200.

The content that the monomers of Formulas 1 and/or 6 are polymerized to form the unit of Formula 11 above may also be equally applied to monomers of other formulas.

For example, when the polymerized unit is formed from the monomers of Formulas 2 and/or 7 above, $R_3$ and $R_4$ moieties of the monomers of Formulas 2 and/or 7 are linked to form a chain, whereby the polymerized unit may be represented by Formula 12 below.

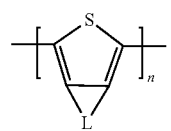

[Formula 12]

In Formula 12, L is the same as L in Formulas 2 and/or 7 above, and n is any number, which is, for example, a number in the range of 4 to 200.

In addition, the above content may be equally applied in a manner that the $R_1$ and $R_2$ moieties in the halogenated thiophene-based monomer of Formulas 3 to 5 form a chain, and a manner that the $R_1$ and $R_2$ moieties in the non-halogenated thiophene-based monomer of Formulas 8 to 10 form a chain.

The polymer may comprise the polymerized unit of such a thiophene-based monomer in an amount of about 50 mol % or more, 55 mol % or more, 60 mol % or more, 65 mol % or more, 70 mol % or more, 75 mol % or more, 80 mol % or more, 85 mol % or more, or 90 mol % or more, relative to the entire polymerized unit of the polymer. The upper limit of such a polymerization unit ratio is not particularly limited, which may be, for example, 100 mol % or less, 95 mol % or less, or 90 mol % or less or so.

The polymer may comprise only polymerized units of thiophene-based monomers having the same structure, and may also comprise polymerized units of two or more thiophene-based monomers having different structures from each other at the same time. For example, the polymer may also comprise simultaneously polymerized units that specific structures are different from each other (for example, structures that $R_1$ and $R_2$ in Formula 11 are different from each other, or structures that L in Formula 12 is different from each other), while having a structure within the category of the structure of the polymerized units of Formulas 11 and 12 or the category of the polymerized units of Formulas 3 to 5 and/or Formulas 8 to 10 as described above. Here, the polymer comprising polymerized units of two or more thiophene-based monomers at the same time may be in the form of a so-called random copolymer, block copolymer or gradient copolymer.

In addition, the polymer may further comprise other types of monomers simultaneously in addition to the polymerized unit of the thiophene-based monomer, and in this case, the polymer may also be in the form of a so-called random copolymer, block copolymer or gradient copolymer.

The polymer is prepared by the above-described method of the present application, which may have a large molecular weight. For example, the molecular weight of the polymer may also be about 2,000 g/mol or more, 2,500 g/mol or more, 3,000 g/mol or more, 3,500 g/mol or more, 4,000 g/mol or more, 4,500 g/mol or more, 5,000 g/mol or more, 5,500 g/mol or more, 6,000 g/mol or more, 6,500 g/mol or more, 7,000 g/mol or more, 7,500 g/mol or more, 8,000 g/mol or more, 8,500 g/mol or more, 9,000 g/mol or more, 9,500 g/mol or more, 10,000 g/mol or more, 15,000 g/mol or more, 20,000 g/mol or more, or 25,000 g/mol or more or so. The molecular weight may be a number average molecular weight (Mn) which is a conversion value with respect to standard polystyrene measured by GPC (gel permeation chromatograph). The upper limit of the molecular weight is not particularly limited. For example, the molecular weight may also be about 1,000,000 g/mol or less, 500,000 g/mol or less, 100,000 g/mol or less, 50,000 g/mol or less, 40,000 g/mol or less, or 30,000 g/mol or less or so.

In the dispersion, the polymer may exhibit an appropriate molecular weight distribution (PDI, ratio (Mw/Mn) of weight average molecular weight (Mw) to number average molecular weight (Mn)). For example, the molecular weight distribution may be about 1.5 or less or so. In another example, the molecular weight distribution may be about 1.45 or less or 1.4 or less, or may also be 1 or more, 1.05 or more, 1.1 or more, 1.15 or more, 1.2 or more, 1.25 or more, or 1.3 or more or so. Such a molecular weight distribution can be obtained by the above-described preparation method of the present application.

In one example, the solvent included in the polymer dispersion is the above-described solvent containing no hydrogen atom, which may be bromotrichloromethane ($CBrCl_3$), tetrachloromethane ($CCl_4$) or dibromodichloromethane ($CBr_2Cl_2$), but is not limited thereto.

The ratio of the polymer in the dispersion is not particularly limited, and for example, the ratio of the polymer in the dispersion may be about 0.1 to 10 weight % or so.

The dispersion is prepared by the above-described method of the present application, where the catalyst is not substantially applied in the preparation process, so that it may be substantially free of a catalyst component. The catalyst component is usually a catalyst component applied to the production of a conductive polymer such as polythiophene, which is, specifically, an oxidant used in an oxidation reaction, and $FeCl_3$, $MnO_2$, $CuCl_2$, Fe(tosylate), $Na_2S_2O_8$ or the like, or a transition metal ligand catalyst such as 1,3-bis(diphenylphosphino)propane]dichloronickel (II), and the like can be exemplified.

Since the polymer dispersion is substantially free of the catalyst component, the ratio of the catalyst component in the dispersion may be about 1 weight % or less, 0.5 weight % or less, 0.1 weight % or less, 0.05 weight % or less, 0.01 weight % or less, 0.005 weight % or less, 0.001 weight % or less, 0.0005 weight % or less, 0.0001 weight % or less, 0.00005 weight % or less, or 0.00001 weight % or less or so. The lower limit of the ratio of the catalyst component is 0 weight %.

The polymer dispersion of the present application as above may be applied to various uses, and as the ratio of unnecessary components such as a catalyst component is minimized as described above and the polymer itself has excellent molecular weight characteristics, it can exhibit significantly superior performance, as compared with the existing conductive polymer, even when applied to the use to which the existing conductive polymer is applied.

The present application provides a method for preparing a polymer, and a polymer. The present application can provide a preparation method that can effectively produce a polymer having desired molecular weight characteristics and solubility in a solvent, and having a monomer composition, which is designed freely and variously according to the purpose, without unnecessary components with excellent polymerization efficiency and conversion rates, and a dispersion comprising the polymer formed by the preparation method.

EXAMPLES

Hereinafter, the present application will be described in detail by way of Examples, but the scope of the present application is not limited by the following Examples.

1. NMR Analysis Method $^1$H-NMR analysis in Examples and Synthesis Examples was performed at room temperature using an NMR spectrometer including a Bruker UltraShield (300 MHz) spectrometer with a triple resonance 5 mm probe. An analyte was diluted to a concentration of about 10 mg/ml or so in a solvent for NMR measurement ($CDCl_3$) and used, and chemical shifts were expressed in ppm.

2. GPC (Gel Permeation Chromatograph)

A number average molecular weight (Mn) and a molecular weight distribution were measured using GPC (gel permeation chromatography). Each polymer of Examples and the like is placed in a 5 mL vial and diluted in chloroform to a concentration of about 1 mg/mL or so. Then, the standard sample for calibration and the sample to be analyzed were filtered through a syringe filter (pore size: 0.45 μm) and then measured. Empower 3 from Waters was used as an analysis program, and the weight average molecular weight (Mw) and the number average molecular weight (Mn) were each obtained by comparing the elution time of the sample with the calibration curve, and the molecular weight distribution (PDI) was calculated as the ratio (Mw/Mn). The measurement conditions of GPC are as follows.

<GPC Measurement Conditions>

Instrument: 2414 from Waters

Column: Using three Styragel from Waters

Solvent: THF

Column temperature: 35° C.

Sample concentration: 1 mg/mL, 1 mL injection

Standard sample: Polystyrene (Mp: 3900000, 723000, 316500, 52200, 31400, 7200, 3940, 485)

3. UV-Vis Spectrum Analysis

After chloroform was placed in a transparent quartz cuvette (45 mm×12.5 mm×12.5 mm) and calibrated in a wavelength region of 200 nm to 1000 nm, UV-vis spectra were performed using Agilent Technologies' Cary 50 UV-Vis spectrophotometer instrument (manufacturer: Agilent Technologies, product name: Cary 50) by a method of measuring absorbance of a sample in which the polymerized sample was diluted with chloroform for the wavelength region.

Synthesis Examples 1 and 2

Compound 1 (DBuProDOT) and Compound 2 (DIBBuProDOT) in Scheme 1 below were synthesized in the following manner.

[Scheme 1]

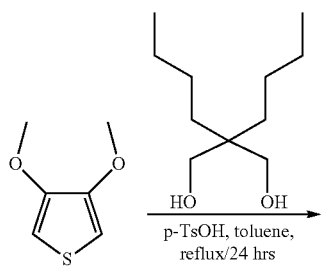

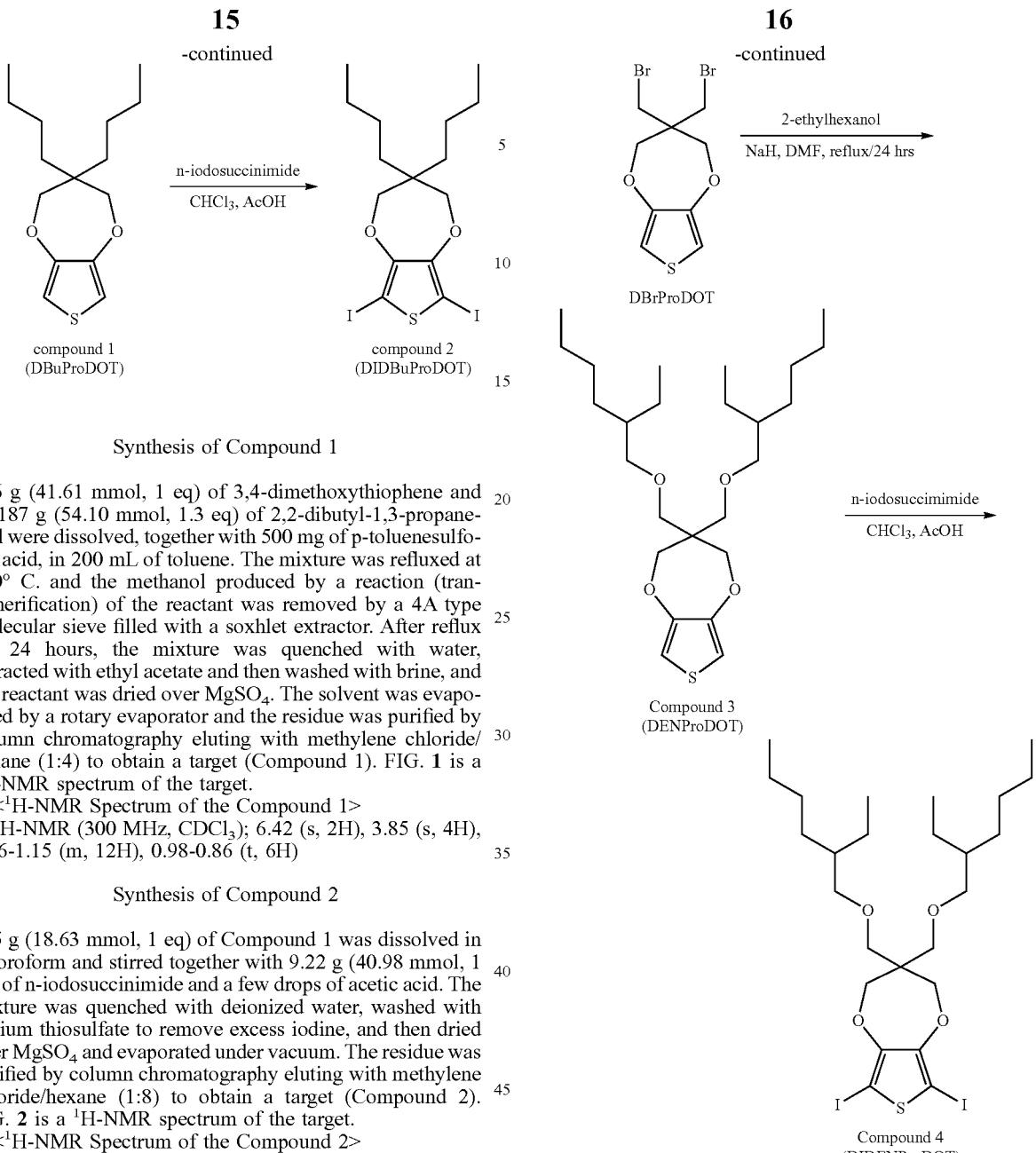

Synthesis of Compound 1

6 g (41.61 mmol, 1 eq) of 3,4-dimethoxythiophene and 10.187 g (54.10 mmol, 1.3 eq) of 2,2-dibutyl-1,3-propanediol were dissolved, together with 500 mg of p-toluenesulfonic acid, in 200 mL of toluene. The mixture was refluxed at 120° C. and the methanol produced by a reaction (transetherification) of the reactant was removed by a 4A type molecular sieve filled with a soxhlet extractor. After reflux for 24 hours, the mixture was quenched with water, extracted with ethyl acetate and then washed with brine, and the reactant was dried over $MgSO_4$. The solvent was evaporated by a rotary evaporator and the residue was purified by column chromatography eluting with methylene chloride/hexane (1:4) to obtain a target (Compound 1). FIG. 1 is a $^1$H-NMR spectrum of the target.

<$^1$H-NMR Spectrum of the Compound 1>
$^1$H-NMR (300 MHz, $CDCl_3$); 6.42 (s, 2H), 3.85 (s, 4H), 1.46-1.15 (m, 12H), 0.98-0.86 (t, 6H)

Synthesis of Compound 2

5 g (18.63 mmol, 1 eq) of Compound 1 was dissolved in chloroform and stirred together with 9.22 g (40.98 mmol, 1 eq) of n-iodosuccinimide and a few drops of acetic acid. The mixture was quenched with deionized water, washed with sodium thiosulfate to remove excess iodine, and then dried over $MgSO_4$ and evaporated under vacuum. The residue was purified by column chromatography eluting with methylene chloride/hexane (1:8) to obtain a target (Compound 2). FIG. 2 is a $^1$H-NMR spectrum of the target.

<$^1$H-NMR Spectrum of the Compound 2>
$^1$H-NMR (300 MHz, $CDCl_3$); 3.92 (s, 4H), 1.46-1.15 (m, 12H), 0.98-0.86 (t, 6H)

Synthesis Examples 3 and 4

Compound 3 (DEHProDOT) and Compound 4 (DIDEH-ProDOT) in Scheme 2 below were synthesized in the following manner.

[Scheme 2]

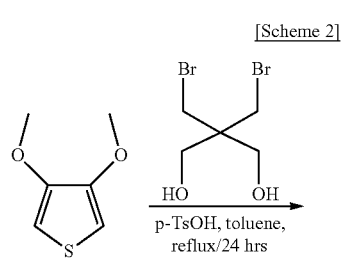

Synthesis of Compound 3

5 g (34.68 mmol, 1 eq) of 3,4-dimethoxythiophene and 10.9 g (41.61 mmol, 1.2 eq) of 2,2-bis(bromomethyl)-1,3-propanediol were dissolved, together with 500 mg of p-toluenesulfonic acid, in 200 mL of toluene. The mixture was refluxed at 120° C. and the methanol produced by a reaction (transetherification) of the reactant was removed by a 4A type molecular sieve filled with a soxhlet extractor. After reflux for 24 hours, the mixture was quenched with water, extracted with ethyl acetate and then washed with brine, and the reactant was dried over $MgSO_4$. The solvent was evaporated by a rotary evaporator and the residue was purified by column chromatography eluting with methylene chloride/hexane (1:2) to obtain a target (DBrProDOT).

2.924 g (60% with oil, 73.09 mmol, 5.0 eq) of NaH was placed in a 250 mL round bottom flask, vacuum-purged and then filled three times with argon. 100 mL of anhydrous dimethylformamide (anhydrous DMF) was added at 0° C., and the cooled solution was stirred at room temperature for 2 hours. 4.19 g (32.164 mmol, 2.2 eq) of 2-ethylhexanol was dissolved in 20 mL of dimethylformamide (DMF), added in drops to the NaH solution and then stirred at room temperature for 6 hours. A mixture that 5 g (14.62 mmol, 1 eq) of the resulting target (DBrProDOT) was dissolved in 20 mL of dimethylformamide (DMF) was added to the stirred product. The prepared solution was refluxed at 80° C. for 24 hours, cooled to room temperature, and then quenched through 1N HCl dropping, and extracted three times with diethyl ether. The organic layer was washed with 1N HCl and brine, dried over $MgSO_4$ and evaporated under vacuum. The residue was purified by column chromatography eluting with methylene chloride/hexane (1:4) to obtain a target (Compound 3). FIG. 3 is a $^1$H-NMR spectrum of the target.

<$^1$H-NMR Spectrum of the Compound 3>
$^1$H-NMR (300 MHz, $CDCl_3$); 6.45 (s, 2H), 4.03 (s, 4H), 3.48 (s, 4H), 3.28 (d, 4H), 1.48 (s, 2H), 1.35-1.15 (m, 16H), 0.95-0.80 (m, 12H)

Synthesis of Compound 4

5 g (11.35 mmol, 1 eq) of Compound 3 was dissolved in chloroform and stirred together with 5.615 g (24.96 mmol, 2.2 eq) of n-iodosuccinimide and a few drops of acetic acid. The mixture was quenched with deionized water, washed with sodium thiosulfate to remove excess iodine, and then dried over $MgSO_4$ and evaporated under vacuum. The residue was purified by column chromatography eluting with methylene chloride/hexane (1:8) to obtain a target (Compound 4). FIG. 4 is a $^1$H-NMR spectrum of the target.

<$^1$H-NMR Spectrum of the Compound 4>
$^1$H-NMR (300 MHz, $CDCl_3$); 4.03 (s, 4H), 3.48 (s, 4H), 3.28 (d, 4H), 1.48 (s, 2H), 1.35-1.15 (m, 16H), 0.95-0.80 (m, 12H)

Example 1

A polymer was synthesized using Compounds 1 and 2 prepared in Synthesis Examples 1 and 2. The compounds were dissolved in bromotrichloromethane ($CBrCl_3$) as a solvent in a molar ratio of 1:2 (Compound 1: Compound 2), and irradiated with LED light having a wavelength of 365 nm to initiate polymerization (first step). Here, the solvent was used after purging with argon. After confirming that most of the monomers (Compounds 1 and 2) were exhausted, the polymerization was continued by adding 2.0 mmol of I2 and a few drops of $HClO_4$ and changing the light source to a q-switch pulsed laser (2 mJ/cm², 10 Hz) with a wavelength of 532 nm (second step). After aliquots were taken at regular intervals during the course of the reaction and diluted in chloroform, the UV-vis absorbance was measured. The aliquots were also rinsed with sodium thiosulfate ($Na_2S_2O_3$) and de-doped with hydrazine ($N_2H_4$) to remove separate iodine molecules, and then a neutralized polymer product was obtained, which was also dissolved in chloroform to perform UV-vis absorbance and GPC (gel permeation chromatograph) analyses.

FIG. 5 is UV-vis absorbance spectra identified while performing the first step of Example 1, and FIG. 6 is also GPC analysis results identified while performing the first step.

In FIG. 5, the absorbance of the aliquots according to the irradiation time (0, 24, 48 and 72 hours) of the LED light source with a wavelength of 365 nm in the first stage is indicated by solid lines, and the absorbance of the aliquots which are subjected to de-doping by I2 washing for the aliquots is indicated over time (24, 48, 72 hours) by dotted lines.

From the solid lines of FIG. 5, it can be confirmed that the main absorption of the aliquots is found at 600 to 1,000 nm, and as the irradiation time of the LED light source increases, the main absorption peak is shifted to the long wavelength region. This shows that as the first step progresses, the conjugated length gradually increases. In the case of the de-doped samples (dotted lines), as the irradiation time of the LED light became longer, absorption shifting to a longer wavelength was observed while vibrating in the region of 400 to 600 nm. In particular, the shoulder peak identified near 570 nm indicates improved intermolecular π-π* transition of a product with a higher molecular weight. The trend shown in FIG. 5 is also consistent with the GPC analysis results (FIG. 6). As shown in FIG. 6, it is shown that the retention time in the GPC analysis decreases as the UV irradiation (LED light irradiation) time increases, and the molecular weight of the polymer increases with the consumption of the monomer (Compound 1). After LED light irradiation for 72 hours, the product (conductive polymer) had a number average molecular weight (Mn) of about 2,200 g/mol, and a molecular weight distribution (PDI) of about 1.20. The photograph in FIG. 6 is the precipitate of the high molecular weight component generated as the polymerization proceeds. On the other hand, FIG. 10 shows a $^1$H-NMR spectrum (blue line) of the polymer formed in Example 1.

Example 2

A polymer was synthesized in the same manner as in Example 1, except that Compounds 3 and 4 prepared in Synthesis Examples 3 and 4 were used (molar ratio of Compounds 3 and 4 was 1:2 (Compound 4: Compound 3)). FIG. 7 is UV-vis spectra identified in the first step of the process, and FIG. 8 is GPC spectra. As shown in FIGS. 7 and 8, the behavior of the UV-vis spectra and GPC spectra in the first step of the process was similar to Example 1. However, in the case of Example 2, the precipitate did not occur by the bulky side chain (diethylhexylmethoxy) of Compounds 3 and 4. FIG. 9 is GPC spectra in the second step of the process (irradiation of pulsed laser with 532 nm). From FIG. 9, it can be confirmed that after pulsed laser irradiation for 12 hours, the initial number average molecular weight at a level of approximately 3,000 g/mol greatly increases to a level of about 29,500 g/mol (molecular weight distribution: 1.35). On the other hand, FIG. 10 shows a $^1$H-NMR spectrum (green line) of the polymer formed in Example 2.

Examples 3 to 5

The polymerization was performed in the same manner as in Example 1, using Compound 2 prepared in Synthesis Example 2 and Compound 3 prepared in Synthesis Example 3, while changing the ratios. The ratios were controlled to 1:2 (Compound 2: Compound 3, Example 3), 1:4 (Compound 2: Compound 3, Example 4) and 1:6 (Compound 2: Compound 3, Example 5), respectively. FIGS. 11 to 13 are UV-vis spectra identified in the process performing the first step of Examples 3 to 5, respectively, and it can be confirmed that they show the same trend as in Example 1.

FIGS. 14 to 16 show $^1$H-NMR spectra of the polymers synthesized in Examples 3 to 5.

FIG. 17 is GPC spectra identified as the second step of Example 3 proceeds, and it can be confirmed that the molecular weight increases as the irradiation time of the pulsed laser with 532 nm increases. That is, from FIG. 15, it can be confirmed that the number average molecular weight has been approximately 2,800 g/mol (molecular weight distribution: about 1.2) at the beginning of the second step, but as the second step proceeds, the number average molecular weight increases to a level of about 27,000 g/mol (molecular weight distribution: 1.25).

The invention claimed is:

1. A polymer dispersion, comprising:

a polymer; and a solvent, wherein the solvent is bromotrichloromethane, tetrachloromethane or dibromodichloromethane, wherein the polymer comprises a polymerized unit of Formula 11 below and wherein the polymer has a number average molecular weight of 2,000 g/mol or more:

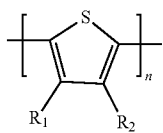

[Formula 11]

wherein, $R_1$ and $R_2$ are each independently hydrogen, an alkyl group, an alkenyl group, an alkynyl group, an alkoxy group, an alkylcarbonyl group, an arylcarbonyl group, an arylcarbonyloxy group, an alkylcarbonyloxy group, a carboxyl group or an aryl group, or are linked to each other to form a ring structure, and n is any number.

2. The polymer dispersion according to claim 1, wherein the polymer comprise two or more polymerized units represented by Formula 11, in which $R_1$ and $R_2$ are different from each other.

3. The polymer dispersion according to claim 1, wherein n in Formula 11 is in a range of 4 to 200.

4. A polymer dispersion comprising:
a polymer; and
a solvent,
wherein the polymer comprises a polymerized unit of Formula 12 and wherein the polymer has a number average molecular weight of 2,000 g/mol or more:

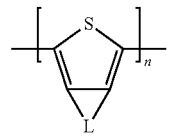

[Formula 12]

wherein, L is a chain forming a ring structure, and n is any number.

5. The polymer dispersion according to claim 1, wherein the polymer has a molecular weight distribution of 1.5 or less.

6. The polymer dispersion according to claim 1, wherein the polymer comprises the polymerized unit of Formula 11 in an amount of 50 mol % or more.

7. The polymer dispersion according to claim 1, wherein the polymer dispersion does not comprise a solvent with a hydrogen atom.

8. The polymer dispersion according to claim 1, wherein an amount of the polymer in the polymer dispersion is from 0.1 weight % to 10 weight %.

9. The polymer dispersion according to claim 1, wherein an amount of a catalyst component in the polymer dispersion is 1 weight % or less.

10. The polymer dispersion according to claim 9, wherein the catalyst component is selected from the group consisting of an oxidant and a transition metal ligand catalyst component.

11. The polymer dispersion according to claim 1, wherein the polymer dispersion is substantially free of a catalyst component.

12. The polymer dispersion according to claim 11, wherein the catalyst component is selected from the group consisting of an oxidant and a transition metal ligand catalyst component.

* * * * *